US012005712B2

(12) United States Patent
Yazawa et al.

(10) Patent No.: US 12,005,712 B2
(45) Date of Patent: Jun. 11, 2024

(54) PRINTING APPARATUS APPLYING INK CONTAINING A COLORING MATERIAL AND A REACTIVE LIQUID, CONTROL METHOD, AND STORAGE MEDIUM

(71) Applicant: CANON KABUSHIKI KAISHA, Tokyo (JP)

(72) Inventors: Takeshi Yazawa, Kanagawa (JP); Hidehiko Kanda, Kanagawa (JP); Yoshinori Nakajima, Kanagawa (JP); Akihiro Tomida, Kanagawa (JP); Takayuki Ushiyama, Chiba (JP); Keiji Kuriyama, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 7 days.

(21) Appl. No.: 17/881,758

(22) Filed: Aug. 5, 2022

(65) Prior Publication Data

US 2023/0074359 A1 Mar. 9, 2023

(30) Foreign Application Priority Data

Aug. 31, 2021 (JP) ................................ 2021-141647

(51) Int. Cl.
*B41J 11/00* (2006.01)
*B41J 2/17* (2006.01)
*B41J 29/38* (2006.01)

(52) U.S. Cl.
CPC ......... *B41J 2/1714* (2013.01); *B41J 11/0015* (2013.01); *B41J 29/38* (2013.01)

(58) Field of Classification Search
CPC ...... B41J 11/0015; B41J 29/38; B41J 29/393; B41M 5/0017
See application file for complete search history.

(56) References Cited

U.S. PATENT DOCUMENTS

| | | | | |
|---|---|---|---|---|
| 10,688,820 | B2 | 6/2020 | Ushiyama et al. | |
| 2018/0257417 | A1 | 9/2018 | Ushiyama et al. | |
| 2019/0118557 | A1* | 4/2019 | Harada | C09D 11/322 |
| 2020/0247163 | A1* | 8/2020 | Baba | B41J 29/393 |

FOREIGN PATENT DOCUMENTS

| | | | | |
|---|---|---|---|---|
| EP | 3098079 A1 * | 11/2016 | | B41J 2/01 |
| JP | 2018-149735 A | 9/2018 | | |

* cited by examiner

*Primary Examiner* — Scott A Richmond
(74) *Attorney, Agent, or Firm* — VENABLE LLP

(57) ABSTRACT

A printing apparatus includes a printing unit to apply ink containing a coloring material, and a reactive liquid that reacts with the ink, to a printing medium, a reading unit to read an ink image on the printing medium, and a printing control unit to cause the printing unit to print a plurality of ink images different in application amount of the reactive liquid on the printing medium. In addition, a determination unit determines an application amount of the reactive liquid in printing using a predetermined type of printing medium, based on a ratio of a plurality of reading results obtained by the reading unit by reading the plurality of ink images printed on the predetermined type of printing medium.

18 Claims, 17 Drawing Sheets

| TYPE OF PRINTING MEDIUM | RCT APPLICATION AMOUNT (%) |
|---|---|
| VINYL CHORIDE FILM | 40 |
| VINYL CHORIDE BANNER | 30 |
| PP FILM | 40 |
| YUPO | 30 |
| PLAIN PAPER | 0 |
| GLOSSY PAPER | 0 |
| ART PAPER | 0 |
| COATED PAPER | 0 |
| •<br>• | |

FIG. 9A

| INPUT | | | OUTPUT | | | | |
|---|---|---|---|---|---|---|---|
| R | G | B | C | M | Y | K | RCT |
| 0 | 0 | 0 | 0 | 0 | 0 | 225 | 0 |
| | ⋮ | | | | ⋮ | | |
| 255 | 255 | 127 | 0 | 0 | 74 | 0 | 0 |
| 255 | 255 | 128 | 0 | 0 | 73 | 0 | 0 |
| 255 | 255 | 129 | 0 | 0 | 71 | 0 | 0 |
| 255 | 255 | 130 | 0 | 0 | 70 | 0 | 0 |
| | ⋮ | | | | ⋮ | | |
| 255 | 255 | 255 | 0 | 0 | 0 | 0 | 0 |

FIG. 9B

| INPUT | | | OUTPUT | | | | |
|---|---|---|---|---|---|---|---|
| R | G | B | | M | Y | K | RCT |
| 0 | 0 | 0 | | 0 | 0 | 225 | 102 |
| | ⋮ | | | | ⋮ | | |
| 255 | 255 | 127 | 0 | 0 | 74 | 0 | 102 |
| 255 | 255 | 128 | 0 | 0 | 73 | 0 | 102 |
| 255 | 255 | 129 | 0 | 0 | 71 | 0 | 102 |
| 255 | 255 | 130 | 0 | 0 | 70 | 0 | 102 |
| | ⋮ | | | | ⋮ | | |
| 255 | 255 | 255 | 0 | 0 | 0 | 0 | 0 |

FIG. 14A

| INK IMAGE | K0 | K1 | K2 | K3 | K4 | K5 | K6 | K7 | K8 |
|---|---|---|---|---|---|---|---|---|---|
| BRIGHTNESS | 54.7 | 54.8 | 54.8 | 54.8 | 54.9 | 54.9 | 54.9 | 55.0 | 55.0 |
| EVALUATION VALUE | — | 54.8 | 54.8 | 54.8 | 54.9 | 54.9 | 54.9 | 55.0 | — |

FIG. 14B

| INK IMAGE | K0 | K1 | K2 | K3 | K4 | K5 | K6 | K7 | K8 |
|---|---|---|---|---|---|---|---|---|---|
| BRIGHTNESS | 30.0 | 42.0 | 49.2 | 53.1 | 54.4 | 54.7 | 54.9 | 54.9 | 55.0 |
| EVALUATION VALUE | — | 40.4 | 48.1 | 52.2 | 54.1 | 54.7 | 54.8 | 54.9 | — |

PRINTING APPARATUS APPLYING INK CONTAINING A COLORING MATERIAL AND A REACTIVE LIQUID, CONTROL METHOD, AND STORAGE MEDIUM

BACKGROUND OF THE INVENTION

Field of the Invention

The present invention relates to a printing apparatus.

Description of the Related Art

A printing apparatus that prints an image on a printing medium by discharging ink from a printhead to the printing medium is known. Recently, a printing apparatus like this performs printing for various applications, and various kinds of printing media are used accordingly. For example, a printer capable of performing printing on a non-absorbing printing medium and a poorly absorbing printing medium has been proposed.

When using a printing medium as described above, it is possible to use, in addition to ink containing a coloring material, a reactive liquid that suppresses ink bleeding or beading by causing a phenomenon such as thickening by reacting with the ink. A reactive liquid like this is unnecessary when using a printing medium having a sufficient absorbency. Japanese Patent Laid-Open No. 2018-149735 discloses a method that performs printing using a reactive liquid when using a low-absorbency printing medium, and performs printing using no reactive liquid when using a high-absorbency printing medium.

The absorbency of a printing medium changes in accordance with the type of printing medium. Also, even printing media made of the same material may have different absorbencies depending on brands. The printing quality sometimes decreases if a reactive liquid is not added in an appropriate amount corresponding to the type of printing medium.

SUMMARY OF THE INVENTION

The present invention provides a technique that determines a reactive liquid application amount corresponding to the type of printing medium.

According to an aspect of the present invention, there is provided a printing apparatus comprising: a printing unit configured to apply ink containing a coloring material, and a reactive liquid that reacts with the ink, to a printing medium; a reading unit configured to read an ink image on the printing medium; a printing control unit configured to cause the printing unit to print a plurality of ink images different in application amount of the reactive liquid on the printing medium; and a determination unit configured to determine an application amount of the reactive liquid in printing using a predetermined type of printing medium, based on a correlation between a plurality of reading results obtained by the reading unit by reading the plurality of ink images printed on the predetermined type of printing medium.

Further features of the present invention will become apparent from the following description of exemplary embodiments (with reference to the attached drawings).

BRIEF DESCRIPTION OF THE DRAWINGS

FIGS. 9A and 9B are views showing examples of an LUT for use in a color conversion process;

FIGS. 14A and 14B are views showing examples of an evaluation value for each ink image;

DESCRIPTION OF THE EMBODIMENTS

Figure 1B:
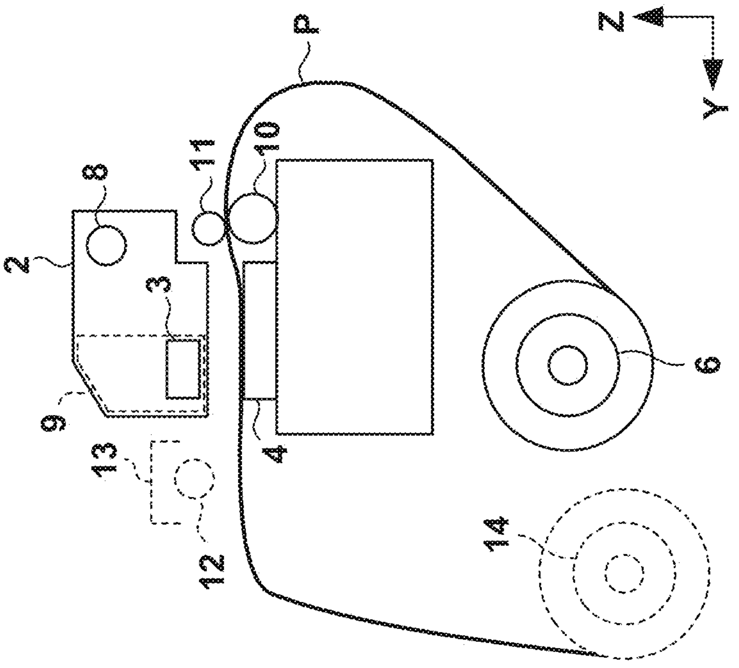
FIG. 1B is a schematic view showing the internal structure of the printing apparatus shown in FIG. 1A.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Outline of Printing Apparatus>

Figure 1A:
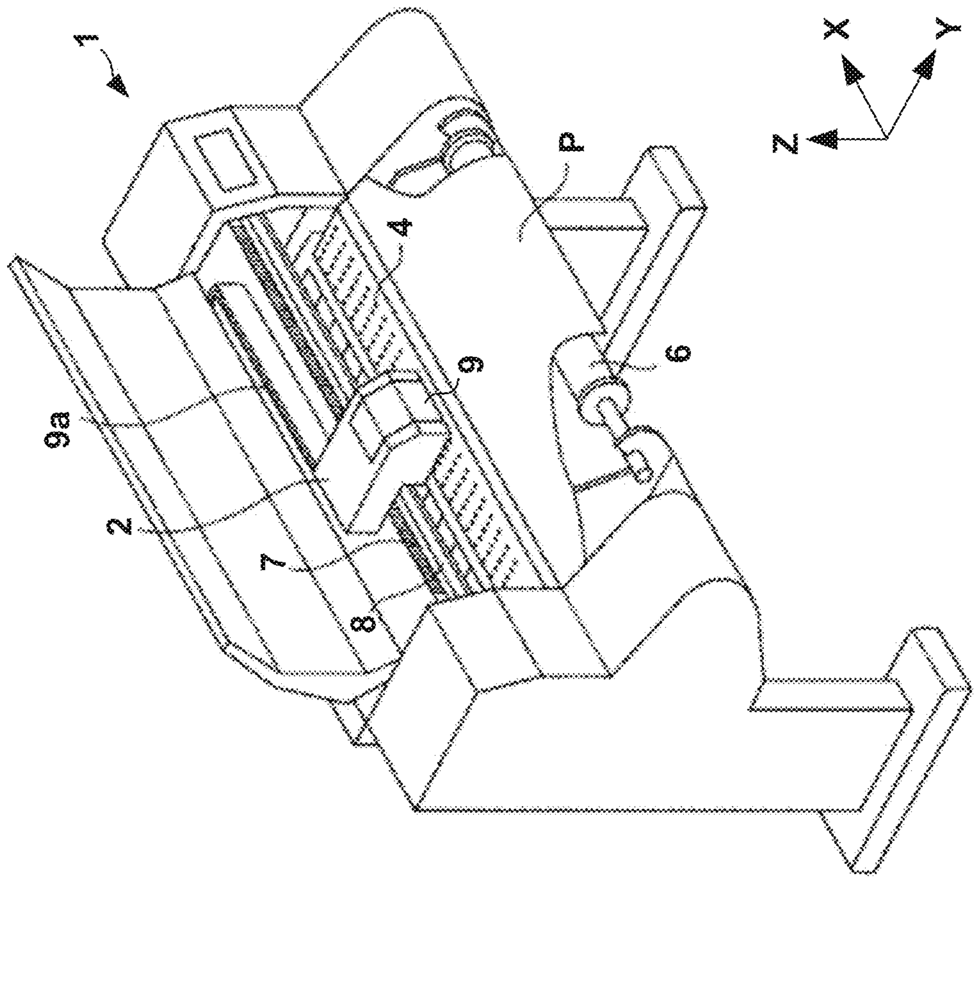
FIG. 1A is a view showing the outer appearance of a printing apparatus according to an embodiment of the present invention.

FIG. 1A is a view showing the outer appearance of a printing apparatus 1 according to this embodiment. FIG. 1B is a schematic view showing, for example, a conveyor mechanism for a printing medium P in the printing apparatus 1. The printing apparatus 1 is a serial inkjet printing apparatus. However, the present invention is also applicable to a full-line inkjet printing apparatus. In FIGS. 1A and 1B, arrows X, Y, and Z respectively indicate the moving direction (main scan direction) of a carriage 2, the conveyance direction (sub-scan direction) of the printing medium P, and the vertical direction. The main scan direction and the sub-scan direction intersect each other, and are orthogonal to each other in this embodiment.

Note that "print" includes not only the formation of significant information such as characters and figures, but also the formation of images, markings, and patterns on a printing medium, regardless of whether the information is significant or insignificant, and the processing of a medium. Printed information is not necessarily actualized so as to be visually perceivable by a human. Also, a "printing medium" can be a plastic film and the like in addition to a sheet of paper.

The printing apparatus 1 includes a conveyor roller 10 for conveying the printing medium P, and a pinch roller 11 urged against the conveyor roller 10. The conveyor roller 10 and the pinch roller 11 sandwich the printing medium P, and feed the printing medium P by rotation onto a platen 4 in the Y direction from a spool 6 on which the printing medium P is wound in the form of a roll.

The carriage 2 includes a printhead 9 and can move both ways in the Y direction on the platen 4 by being guided by a guide shaft 8 extended in the Y direction. The carriage 2 can move between a printing position and a printing standby position (home position) in the X direction. The printing position is a position where the printhead 9 exists in an image printing region on the printing medium P. The printing standby position is a position where the printhead 9 is spaced apart from the printing medium P in the Y direction. The position of the carriage 2 is specified by a position signal which an encoder sensor 5 (FIG. 3) installed in the carriage 2 outputs by reading an encoder 7 extended in the Y direction.

While the carriage 2 is moving, printing is performed by applying ink as a printing material from the printhead 9 at a timing based on the position signal. A process in which the printhead 9 applies ink while the carriage 2 is moving will be called printing scan in some cases. Printing scan can be performed in only forward movement of the carriage 2, and can also be performed in both forward movement and return movement of the carriage 2. An image is printed on the printing medium P by alternately repeating printing scan and conveyance by a predetermined unit of the printing medium P.

In printing scan, scanning is performed at, for example, a scan rate of 45 inch/sec, and a discharge operation is performed with a resolution of 1,200 dpi (1/1,200 inch). Scanning can also be performed at a rate higher than 45 inch/sec. When data of one scan is stored in a buffer, the carriage 2 is scanned, and printing is performed as described above.

A belt transmission mechanism can be used as a driving mechanism of the carriage 2. The belt transmission mechanism includes a pair of pulleys spaced apart in the X direction, and a carriage belt wound around the pair of pulleys, and runs the carriage belt by rotating the pulleys by using a carriage motor (FIG. 3: CR motor 16). The carriage 2 is fixed to the carriage belt. Another driving system can also be used instead of the belt transmission mechanism. An example is a system including a lead screw extending in the X direction, and an engaging portion that is formed in the carriage unit 2 and engages with a groove of the lead screw.

In this embodiment, a read sensor 3 for reading the surface of the printing medium P is installed. The read sensor 3 is, for example, a reflective photosensor. The read sensor 3 can read an ink image formed on the printing medium P when the carriage 2 moves. The read sensor 3 is installed in the carriage 2 in this embodiment, but the present invention is not limited to this. That is, the read sensor 3 can also be a sensor extended in the main scan direction and capable of reading the whole range of the printing medium P in the X direction.

A flexible circuit board 9*a* for supplying control signals such as a printing signal for discharge driving and a temperature control signal is attached to the printhead 9. The other end of the flexible circuit board 9*a* is connected to a control circuit (to be described later).

While printing is stopped, the liquid discharge surface of the printhead 9 can be capped. Before printing is started, the cap is opened to make the printhead 9 capable of discharging ink.

The printing apparatus 1 can also include a heater 12 and a heater cover 13 as a curing unit. This unit is installed on the downstream side in the sub-scan direction Y from the position where the carriage 2 scans back and forth in the main scan direction X. The heat of the heater 12 accelerates drying of ink in a liquid state on the printing medium P. The heater 12 is covered with the heater cover 13. The heater cover 13 has a function of efficiently emitting the heat of the heater 12 onto the printing medium P, and a function of protecting the heater 12. Examples of the heater 12 are a sheathed heater and a halogen heater. The heating temperature of the heater 12 is set by taking account of the film formability and productivity of a resin emulsion, and the heat resistance of the printing medium P. Note that the heater 12 can also be hot air blast heating from above the printing medium P, or contact-type heat-conductive heater heating from below the printing medium P. Note also that two or more heaters 12 can be installed and used together as long as a temperature measured by a radiation thermometer (not shown) does not exceed the set value of a heating temperature on the printing medium P.

The printing apparatus 1 can further include a take-up spool 14. The printing medium P printed by the printhead 9 is taken up by the take-up spool 14 and forms a roll-like taken-up medium.

Figure 2:
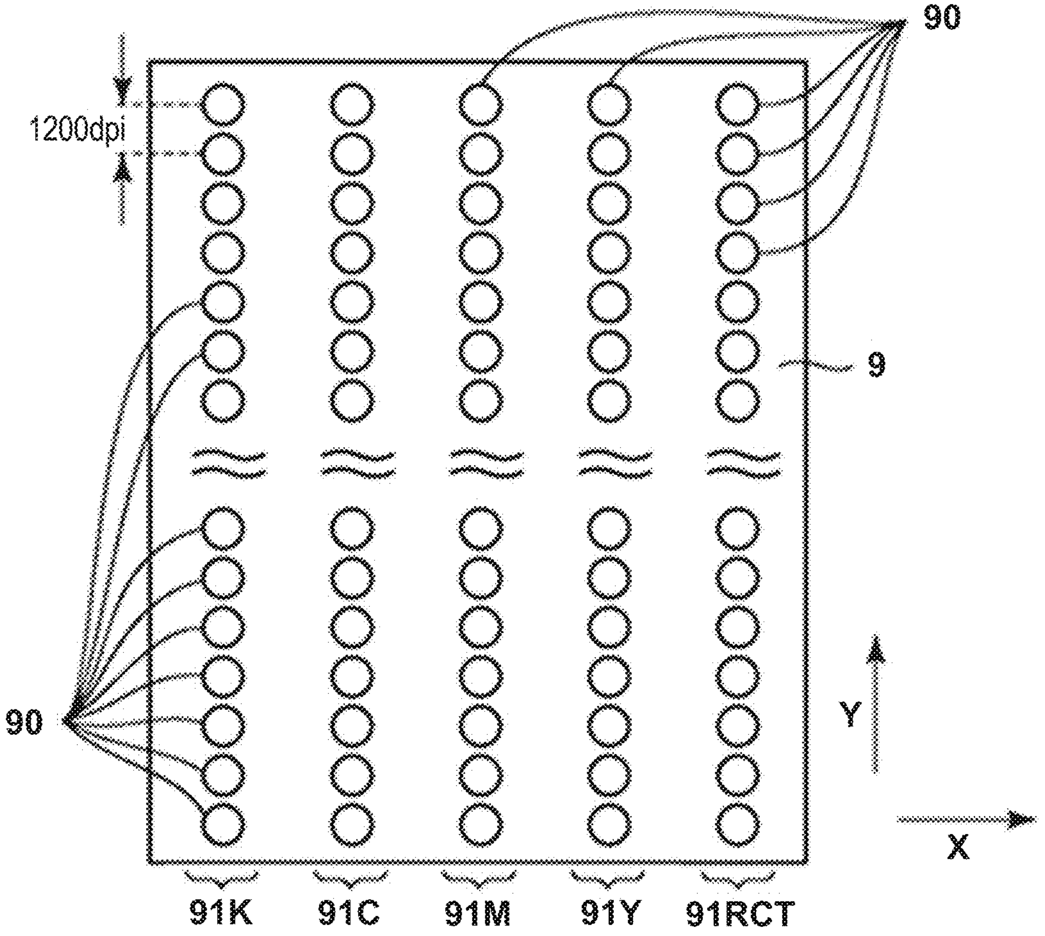
FIG. 2 is a schematic view showing a liquid discharge surface of a printhead.

FIG. 2 is a schematic view of the liquid discharge surface of the printhead 9. The printhead 9 has a plurality of discharge ports 90 for discharging a liquid, and applies the liquid to the printing medium P by discharging the liquid to it. The discharge ports 90 include discharge port rows 91K, 91C, 91M, and 91Y for discharging liquid inks (also called color inks) containing coloring materials, and a discharge port row 91RCT for discharging a reactive liquid that reacts with the color inks. The discharge port rows 91K, 91C, 91M, and 91Y respectively discharge black ink (K), cyan ink (C), magenta ink (M), and yellow ink (Y). The reactive liquid is a liquid not containing a coloring material but containing a reactive component that reacts with the coloring materials contained in the color inks, and is a liquid that promotes thickening or gelation of the color ink. When the reactive liquid comes in contact with the color ink on the printing medium P, bleeding of the color ink can be suppressed.

In the printhead 9, these discharge port rows are arranged in the order of the discharge port rows 91K, 91C, 91M, 91Y, and 91RCT in the X direction. In each of the discharge port rows 91K, 91C, 91M, 91Y, and 91RCT, 1,280 discharge ports 90 for discharging corresponding ink are arrayed at a density of 1,200 dpi in the Y direction (array direction). Note that in this embodiment, the discharge amount of ink discharged from one discharge port 90 at one time is about 4.5 pl. The discharge port rows 91K, 91C, 91M, 91Y, and 91RCT are connected to tanks (not shown) storing the respective corresponding inks and the reactive liquid, and the inks and the reactive liquid are supplied. Note that the printhead 9 and the tanks can be either integrated with each other or separated from each other. Note also that examples of the detailed compositions of the black ink (K), cyan ink (C), magenta ink (M), yellow ink (Y), and the reactive liquid (RCT) will be described later.

<Control Unit>

Figure 3:
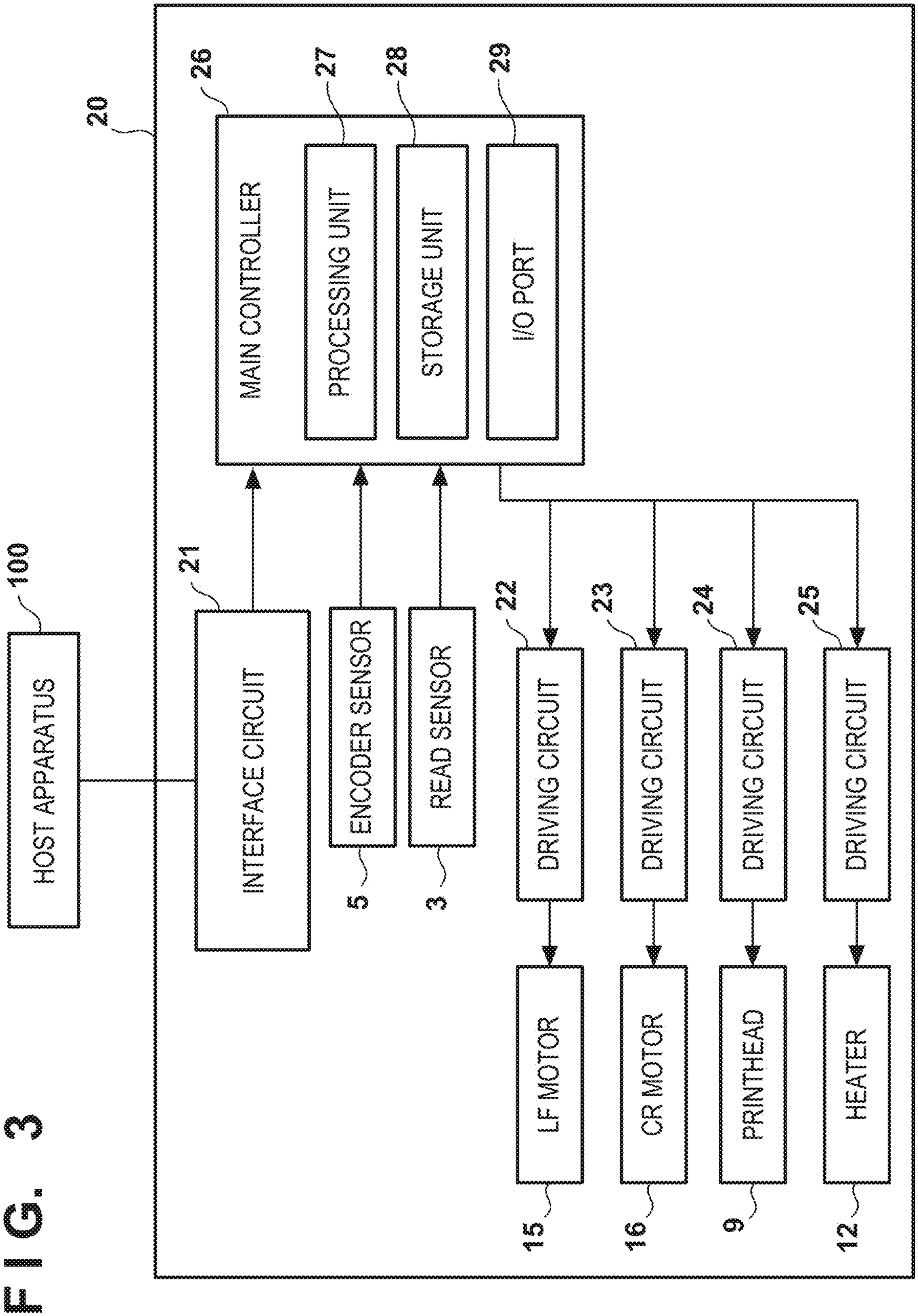
FIG. 3 is a block diagram of a control unit.

FIG. 3 is a block diagram of a control unit 20 included in the printing apparatus 1. A main controller 26 includes a processing unit 27 for controlling the printing apparatus 1, a storage unit 28 for storing data, and an I/O port (Input/Output port) 29. The processing unit 27 is a processor and is a CPU of the control unit 20. The storage unit 28 is a storage device, for example, a memory such as a RAM or a ROM, and stores programs to be executed by the processing unit 27 and various kinds of data. The I/O port 29 is an interface between an external device and the processing unit 27. Sensors such as an encoder sensor 5 and a read sensor 3 are connected to the I/O port 29, and the processing unit 27 can obtain the detection results of these sensors. The I/O port 29 is also connected to an LF motor 15 as a driving source of the conveyance roller 10, a CR motor 16 as a driving source for moving the carriage 2, the printhead 9, and the heater 12 via driving circuits 22 to 25, and the processing unit 27 can control driving of these parts.

The main controller 26 is also connected to a host apparatus 100 via an interface circuit 21. The main controller 26 receives a command signal (command) and a printing information signal containing printing data transmitted from the host apparatus 100, and transmits status information of the printing apparatus 1 to the host apparatus 100 as needed. The host apparatus 100 is, for example, a personal computer in which a printer driver for controlling the printing apparatus 1 is installed.

<Multipass Printing Control>

The printing apparatus 1 of this embodiment can print an image by so-called multipass printing control that performs printing in a unit region on the printing medium P by performing scanning a plurality of times. Note that in this embodiment, printing is completed by performing scanning eight times in the unit region.

Figure 4:
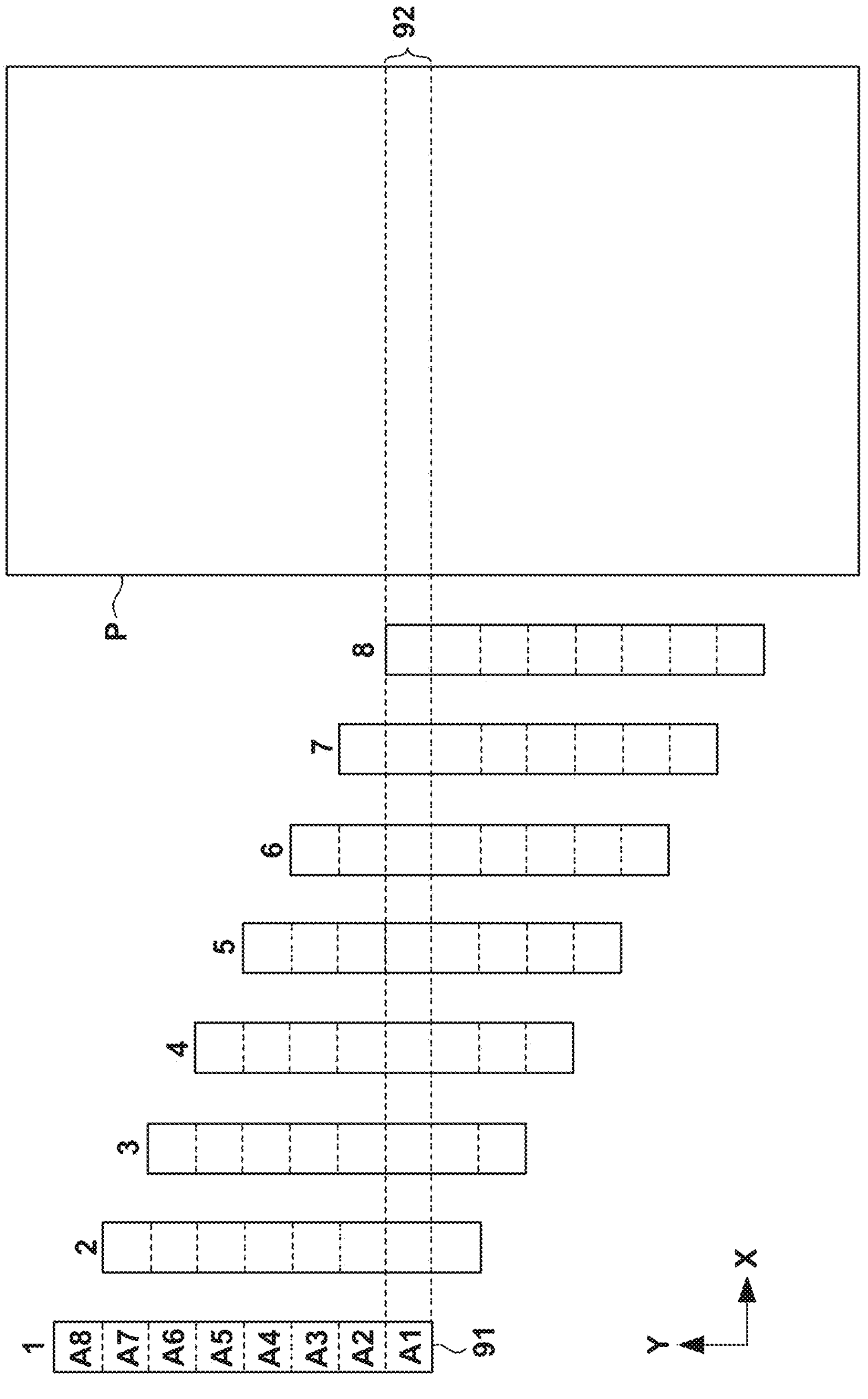
FIG. 4 is a view for explaining multipass printing control.

FIG. 4 is a view for explaining the multipass printing control performed in this embodiment. In this embodiment, printing scan is performed eight times in a unit region from each of eight discharge port groups A1 to A8 obtained by grouping the discharge port rows 91 in the Y direction. Note that in practice, the printing medium P is conveyed toward the downstream side in the Y direction between scans by the printhead 9. To simplify the explanation, however, FIG. 4 will be explained by assuming that the printhead 9 is moved toward the upstream side in the Y direction between scans without moving the position of the printing medium P.

First, in the first scan, the printhead 9 is scanned in a positional relationship in which a unit region 92 on the printing medium P and the discharge port group A1 in the discharge port row 91 oppose each other, and a discharge operation by the discharge port group A1 is performed in the unit region 92 in accordance with printing data corresponding to the first printing scan. When this first scan is complete, the printing medium P is conveyed in the Y direction by a distance corresponding to one discharge port group. Then, the second scan is performed, and a discharge operation by the discharge port group A2 is performed in the unit region 92 in accordance with printing data corresponding to the second scan. After that, the conveyance of the printing medium P and the discharge operation by the printhead 9 are alternately performed, thereby executing discharge operations by the discharge port groups A3 to A8 in the third to eighth scans with respect to the unit region 92. Multipass printing for the unit region 92 is thus complete.

Figure 5A:
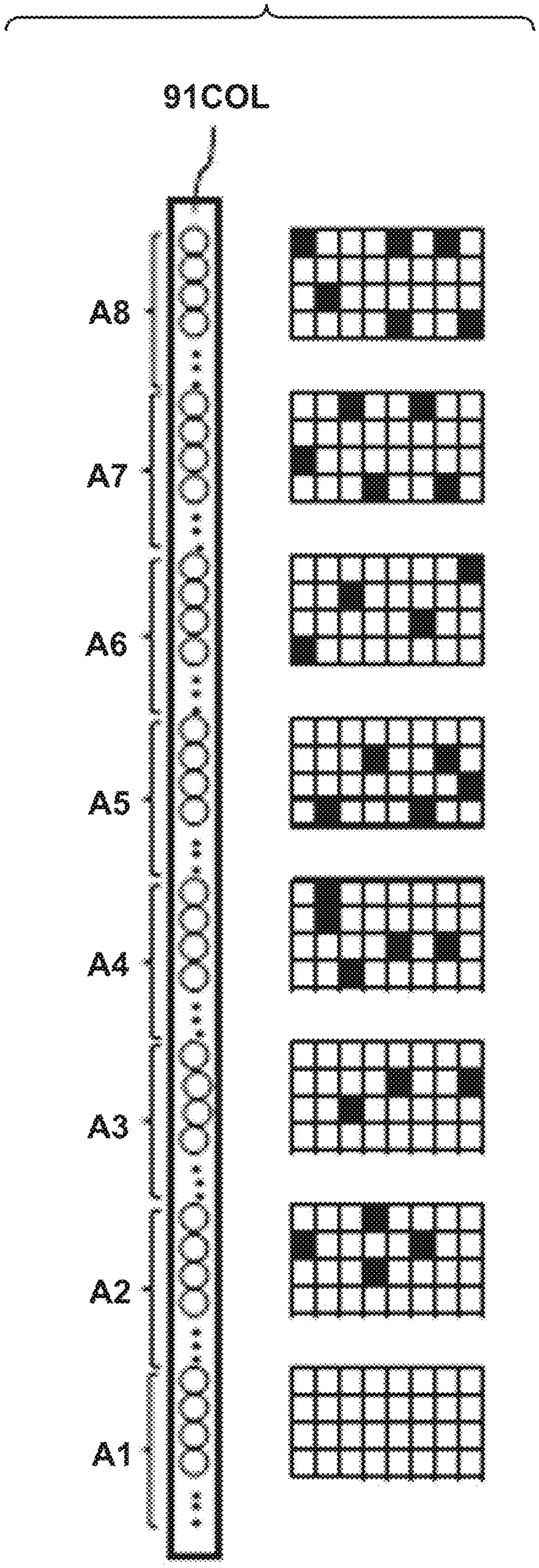
FIGS. 5A and 5B are views showing examples of a mask pattern.
Figure 5B:
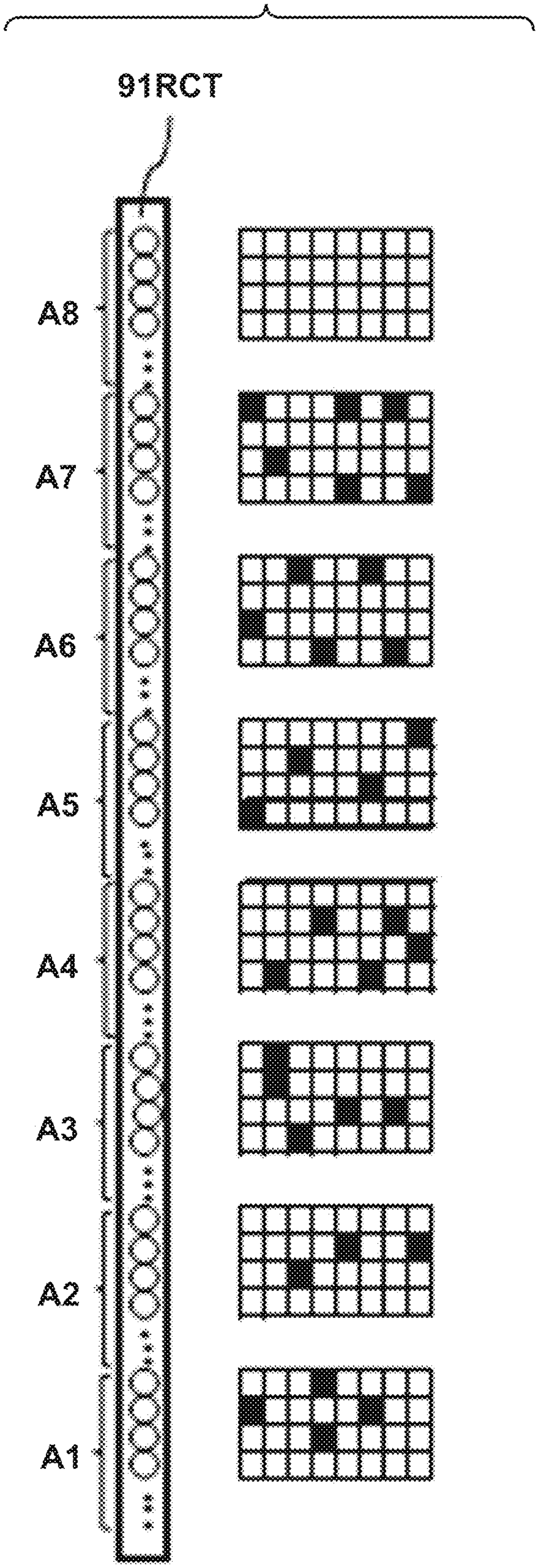

FIGS. 5A and 5B are views showing mask patterns to be used in this embodiment. A black pixel indicates a printing permitting pixel that permits discharge of ink or a reactive liquid when discharge of ink or a reactive liquid is determined by quantized data. A white pixel indicates a pixel that does not permit discharge of ink or a reactive liquid even when discharge of ink or a reactive liquid is determined by quantized data. These examples shown in FIGS. 5A and 5B depict mask patterns each having a size of 4 pixels×8 pixels. By repetitively applying these mask patterns in the X and Y directions, a distribution process is performed on all quantized data corresponding to each unit region.

FIG. 5A shows mask patterns to be applied to quantized data corresponding to a color ink discharge port row 91COL (the cyan ink discharge port row 91C, the magenta ink discharge port row 91M, the yellow ink discharge port row 91Y, or the black ink discharge port row 91K). As shown in FIG. 5A, in the discharge port groups A1 to A8 of the color ink discharge port row 91COL corresponding to the first to eighth scans, printing permitting pixels are arranged in only mask patterns corresponding to the discharge port groups A2 to A8 corresponding to the second to eighth scans. That is, no printing permitting pixels are arranged in the discharge port group A1 corresponding to the first scan. In this embodiment, therefore, the color inks are discharged in only the second to eighth scans of the eight scans.

On the other hand, in the reactive liquid discharge port row 91RCT, of the discharge port groups A1 to A8 corresponding to the first to eight scans, printing permitting pixels are arranged in mask patterns corresponding to the discharge port groups A1 to A7 corresponding to the first to seventh scans. That is, no printing permitting pixels are arranged in a mask pattern corresponding to the discharge port group A8 corresponding to the eighth scan. In this embodiment, therefore, the reactive liquid is discharged in only the first to seventh scans of the eight scans.

In this embodiment as explained above, the reactive liquid is applied on the printing medium P before the color inks are applied. Therefore, when each color ink strikes the printing medium P, the color ink instantly comes in contact with the reactive liquid, so aggregation of the coloring material instantly begins. As a consequence, bleeding of the color ink can be reduced.

Also, the printing medium P on which the color inks and the reactive liquid are printed is conveyed and passed through the heater 12. Consequently, the inks are heated and dried, so the inks are easily fixed even on a non-absorbable printing medium and a poorly absorbable printing medium.

<Compositions of Inks and Reactive Liquid>

Each of the color inks (C, M, Y, and K) and the reactive liquid (RCT) to be used in this embodiment contains a water-soluble organic solvent. The water-soluble organic solvent preferably has a boiling point of 150° C. (inclusive) to 300° C. (inclusive) for the reasons of the wettability and the moisture retaining property of the liquid discharge surface of the printhead 9. Particularly favorable solvents are ketone-based compounds such as acetone and cyclohexane, propylene glycol derivatives such as tetraethylene glycol dimethyl ether, and heterocyclic compounds having a lactam structure such as N-methyl-pyrrolidone and 2-pyrrolidone. The content of the water-soluble organic solvent is preferably 3 wt % (inclusive) to 30 wt % (inclusive) from the viewpoint of the discharge performance. More specifically, examples of the water-soluble organic solvent are alkyl alcohols having 1 to 4 carbon atoms such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones or keto alcohols such as acetone and diacetone alcohol; ethers such as tetrahydrofuran and dioxane; polyalkylene glycols such as polyethylene glycol and polypropylene glycol; ethylene glycol; alkylene glycols in which an alkylene group contains 2 to 6 carbon atoms, such as propylene glycol, butylene glycol, triethylene glycol, 1,2,6-hexane triol, thiodiglycol, hexylene glycol, and diethylene glycol; lower alkyl ether acetate such as polyethylene glycol monomethyl ether acetate; glycerin; lower alkyl ethers of polyalcohol such as ethylene glycol monomethyl (or ethyl) ether, diethylene glycol methyl (or ethyl) ether, and triethylene glycol monomethyl (or ethyl) ether; polyalcohol such as trimethylol propane and trimethylol ethane; and N-methyl pyrrolidone, 2-pyrrolidone, and 1,3-dimethyl-2-imidazolidinon. The water-soluble organic solvents as described above can be used singly or in the form of a mixture. Also, it is desirable to use deionized water as water. Note that the content of the water-soluble organic solvent in the reactive liquid (RCT) is not particularly limited. To give desired physical property values to the color inks (C, M, Y, and K) as needed, it is possible to properly add a surfactant, an antifoaming agent, an antiseptic agent, and an anti-mold agent in addition to the abovementioned components.

In addition, the color inks (C, M, Y, and K) and the reactive liquid (RCT) to be used in this embodiment can contain a surfactant. The surfactant can be used as a penetrant for the purpose of improving the penetration property of ink to an inkjet printing medium. As the addition amount of the surfactant increases, a property that decreases the surface tension of ink increases, so the wettability and penetration property of ink with respect to the printing medium improve. It is possible to add a small amount of an acetylene glycol EO adduct as the surfactant, and perform adjustment such that the surface tension of each ink is 30 dyn/cm or less and the surface tension difference between inks is 2 dyn/cm or less. More specifically, the surface tension of each ink can uniformly be adjusted to about 28 to 30 dyn/cm. The surface tension was measured by using the fully automatic surface tensiometer CBVP-Z (manufactured by Kyowa Interface Science). Note that the measurement device is not limited to the above example as long as the surface tension of ink can be measured.

The pH of each ink can be stable on the alkali side, and the value is, for example, 8.5 to 9.5. The pH of each ink is preferably 7.0 (inclusive) to 10.0 (inclusive) in order to prevent elution and deterioration of a member that comes in contact with each ink in the printing apparatus or the printhead, and to prevent a decrease in solubility of a dispersion resin in ink. The pH was measured by using the pH METER F-52 manufactured by HORIBA. Note that the measurement device is not limited to the above example as long as the pH of ink can be measured.

(Color Inks)

Of black ink (K), cyan ink (C), magenta ink (M), and yellow ink (Y) to be used in this embodiment, examples of cyan ink (C) and magenta ink (M) will be explained in detail below in order to simplify the explanation.

//Magenta Ink//

Making of Dispersion

First, an AB block polymer having an acid value of 300 and a number-average molecular weight of 2,500 was made by a routine procedure by using benzyl acrylate and methacrylic acid as materials. Then, the AB block polymer was neutralized by an aqueous potassium hydroxide solution and diluted with ion-exchanged water, thereby making an aqueous homogeneous 50-mass % polymer solution.

100 g of the above polymer solution, 100 g of C.I. pigment red 191, and 300 g of ion-exchanged water were mixed, and the mixture was mechanically stirred for 0.5 hrs.

Then, a microfluidizer was used to process this mixture by passing it through an interaction chamber five times at a liquid pressure of about 70 MPa.

Furthermore, the dispersion obtained as described above was centrifuged (12,000 rpm, 20 min), thereby removing a non-dispersion containing coarse particles and obtaining a magenta dispersion. The obtained magenta dispersion had a pigment concentration of 10 mass % and a dispersant concentration of 5 mass %.

Making of Ink

Ink was made as follows. The following components were added to the abovementioned magenta dispersion to obtain a predetermined concentration. Then, these components were sufficiently mixed and stirred, and the mixture was filtered under pressure by using a micro filter having a pore size of 2.5 (manufactured by FUJIFILM), thereby preparing color ink having a pigment concentration of 4 mass % and a dispersant concentration of 2 mass %.

| | |
|---|---|
| Abovementioned magenta dispersion | 40 parts |
| 2-pyrrolidone | 5 parts |
| 2-methyl-1,3-propanediol | 15 parts |
| Acetylene glycol EO adduct | 0.5 parts |
| Ion-exchanged water | balance |
| (manufactured by Kawaken Fine Chemicals) | |

//Cyan Ink//

Making of Dispersion

First, an AB block polymer having an acid value of 250 and a number-average molecular weight of 3,000 was made by a routine procedure by using benzyl acrylate and methacrylic acid as materials. Then, the AB block polymer was neutralized by an aqueous potassium hydroxide solution and diluted with ion-exchanged water, thereby making an aqueous homogeneous 50-mass % polymer solution.

180 g of the above polymer solution, 100 g of C.I. pigment blue 15:3, and 910 g of ion-exchanged water were mixed, and the mixture was mechanically stirred for 0.5 hrs.

Then, a microfluidizer was used to process this mixture by passing it through an interaction chamber five times at a liquid pressure of about 70 MPa.

Furthermore, the dispersion obtained as described above was centrifuged (12,000 rpm, 20 min), thereby removing a non-dispersion containing coarse particles and obtaining a cyan dispersion. The obtained cyan dispersion had a pigment concentration of 10 mass % and a dispersant concentration of 10 mass %.

Making of Ink

Ink was made as follows. The following components were added to the abovementioned cyan dispersion to obtain a predetermined concentration. Then, these components were sufficiently mixed and stirred, and the mixture was filtered under pressure by using a micro filter having a pore size of 2.5 μm (manufactured by FUJIFILM), thereby preparing color ink having a pigment concentration of 4 mass % and a dispersant concentration of 2 mass %.

| | |
|---|---|
| Abovementioned cyan dispersion | 20 parts |
| 2-pyrrolidone | 5 parts |
| 2-methyl-1,3-propanediol | 15 parts |
| Acetylene glycol EO adduct | 0.5 parts |
| Ion-exchanged water | balance |
| (manufactured by Kawaken Fine Chemicals) | |

//Reactive Liquid//

The reactive liquid contains a reactive component that reacts with a pigment contained in ink, and aggregates or gelates the pigment. More specifically, this reactive component is a component that can destroy the dispersion stability of ink containing a pigment stably dispersed or dissolved in an aqueous medium by the action of an ionic group, when the component is mixed with the ink on a printing medium or the like. More specifically, glutaric acid is used as described above.

Note that it is not always necessary to use glutaric acid, and various organic acids can be used as the reactive component of the reactive liquid in this embodiment as long as the acids are water-soluble. Practical examples of the organic acids are oxalic acid, polyacrylic acid, formic acid, acetic acid, propionic acid, glycolic acid, malonic acid, malic acid, maleic acid, ascorbic acid, levulinic acid, succinic acid, glutaric acid, glutamic acid, fumaric acid, citric acid, tartaric acid, lactic acid, pyrrolidone carboxylic acid, pyrone carboxylic acid, pyrrole carboxylic acid, furane carboxylic acid, pyridine carboxylic acid, coumaric acid, thiophene carboxylic acid, nicotinic acid, oxy succinic acid, and dioxy succinic acid. When using the total mass of compositions contained in the reactive liquid as a reference, the content of the organic acid is preferably 3.0 mass % (inclusive) to 90.0 mass % (inclusive), and more preferably 5.0 mass % (inclusive) to 70.0 mass % (inclusive).

Making of Ink

In this embodiment as described above, glutaric acid (manufactured by Wako Pure Chemical Industries) was used as the organic acid, and a reactive liquid was made by mixing the following components.

| | |
|---|---|
| Glutaric acid | 3 parts |
| 2-pyrrolidone | 5 parts |
| 2-methyl-1,3-propanediol | 15 parts |
| Acetylene glycol EO adduct | 0.5 parts |
| Ion-exchanged water | balance |
| (manufactured by Kawaken Fine Chemicals) | |

<Printing Medium>

The printing apparatus 1 according to this embodiment can perform printing on a plurality of types of printing media. Printing media printable by this embodiment are classified into two printing media, that is, a printing medium having a relatively low absorbency to water contained in ink, and a printing medium having a relatively high absorbency to water.

Examples of the printing medium having a relatively low absorbency are a printing medium in which a plastic layer is formed on the outermost surface of a base material; a printing medium in which no ink absorbing layer is formed on a base material; and glass, YUPO, and a sheet, a film, and a banner of plastic and the like. Examples of the abovementioned applied plastic are polyvinyl chloride, polyethylene terephthalate, polycarbonate, polystyrene, polyurethane, polyethylene, and polypropylene. These low-absorbency printing media are excellent in water resistance, light resistance, and abrasion resistance, and hence are generally used when printing a printing object for outdoor exhibition.

On the other hand, the printing medium having a relatively high absorbency is a printing medium in which an ink absorbing layer is formed on the surface of a base material, and examples are plain paper and glossy paper. These printing media are inferior to the printing media having a relatively low absorbency in water resistance, light resistance, and abrasion resistance, but have a high color developability because they can absorb ink applied to the ink absorbing layer, and hence can perform high-image-quality printing. Accordingly, these printing media are generally used when printing a printing object for indoor exhibition.

<Generation of Printing Data>

Figure 6:
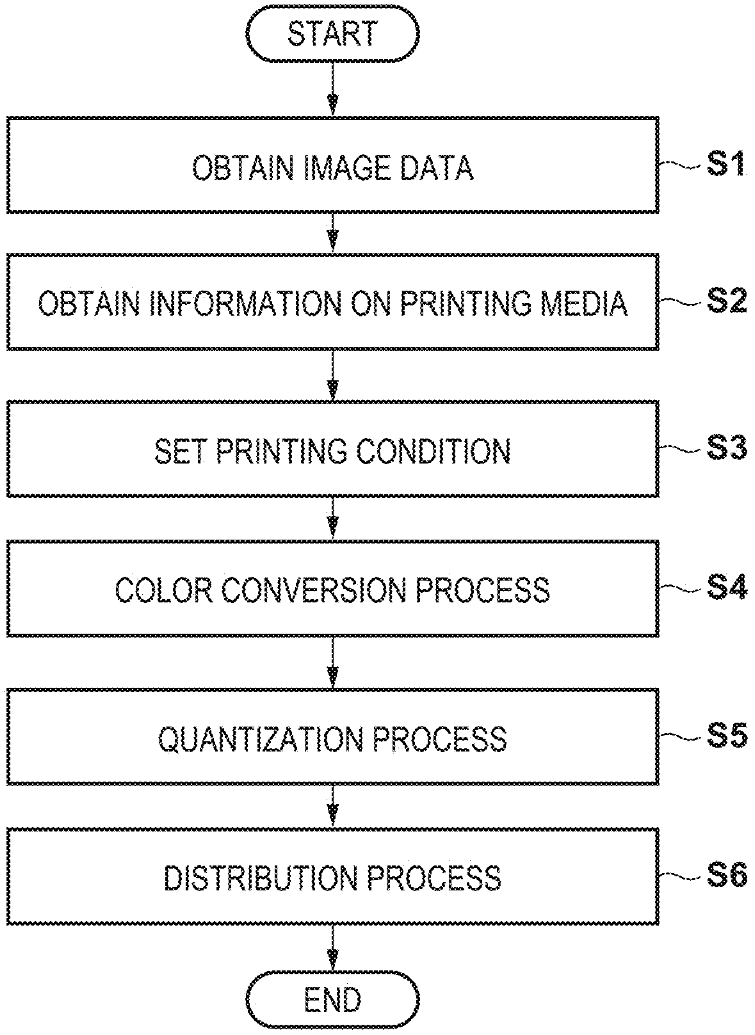
FIG. 6 is a flowchart showing a processing example of a processing unit.

FIG. 6 is a flowchart showing a processing example to be executed by the processing unit 27, particularly, an example of a printing data generation process (image processing). In S1, the processing unit 27 acquires RGB image data from the host apparatus 100. In S2, the processing unit 27 acquires information about the type of the printing medium P to be used in printing. In this embodiment, the user selects the type of the printing medium P to be used in printing, and the processing unit 27 acquires information about the type of printing medium as the selection result.

Figures 7, 8:
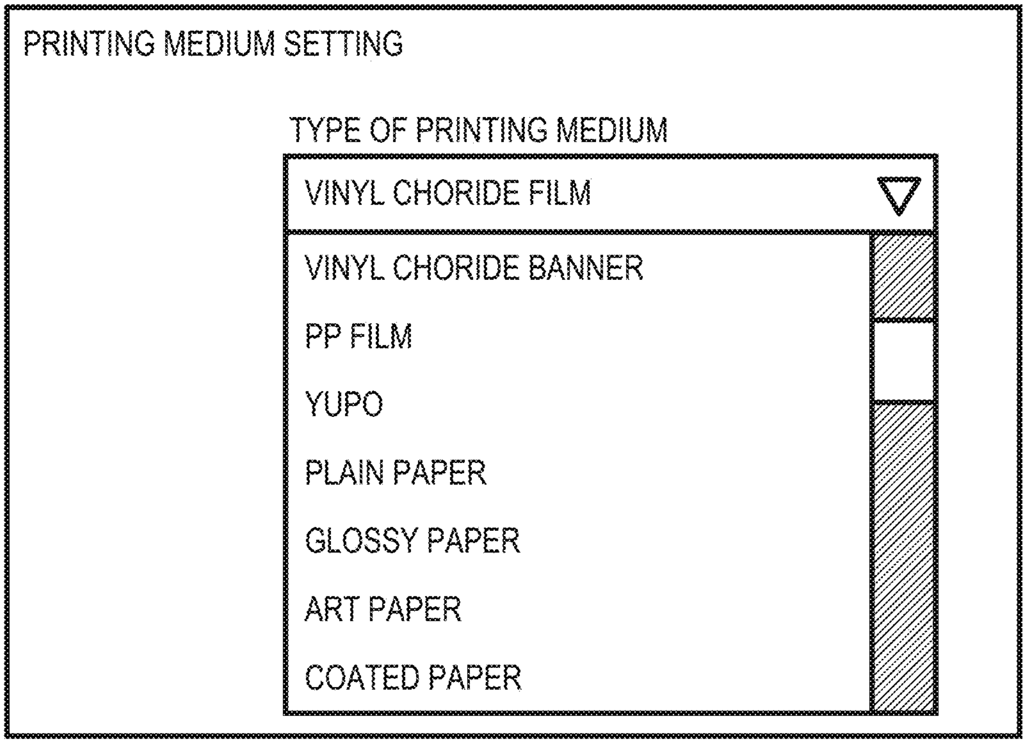
FIG. 7 is a view showing an example of a selection screen for selecting the type of printing medium.
FIG. 8 is a view showing a table representing application amounts of a reactive liquid.

FIG. 7 is a view schematically showing a screen (user interface, UI) to be displayed on the display of the host apparatus 100 when the user inputs the information about the type of printing medium. FIG. 7 shows eight types of printing media, that is, “vinyl chloride film”, “vinyl chloride banner”, “PP film”, “YUPO”, “plain paper”, “glossy paper”, “art paper”, and “coated paper”. The user selects one printing medium from a plurality of types of printing media including at least the eight types of printing media. Then, information of the selected printing medium is input from the host apparatus 100 to the printing apparatus 1, and acquired in S2.

Note that the form in which the user inputs information about the type of printing medium to be used in printing via the UI has been described, but the present invention is not limited to this. An example is a form in which the printing apparatus includes a sensor for discriminating the type of printing medium, and information about the type of printing medium is automatically acquired in accordance with the determination result of the sensor. It is also possible to allow the user to newly register types of printing media in addition to the preregistered eight types of printing media. In addition, the UI shown in FIG. 7 can be presented to the user not on the host apparatus 100 but on the printing apparatus 1.

Referring to FIG. 6 again, in S3, one of a plurality of printing conditions is set in accordance with the information about the type of printing medium acquired in S2. Of the eight types of printing media described above, “vinyl chloride film” and “vinyl chloride banner” are printing media in which a polyvinyl chloride layer is formed on a base material. Also, “PP film” is a film formed by polypropylene, and “YUPO” is synthetic paper using polypropylene as a material. These printing media have low absorbency. Therefore, when information indicating these printing media is acquired as the information about the printing medium to be used in printing, a printing condition for a printing medium having a relatively low absorbency is set in S3. On the other hand, “plain paper”, “glossy paper”, “art paper”, and “coated paper” generally have high absorbency. Therefore, when the information about the type of printing medium acquired in S2 indicates these printing media, a printing condition for a printing medium having a relatively high absorbency is set in S3.

The printing condition in S3 includes the condition of the application amount of the reactive liquid. FIG. 8 shows an example of application amount information representing the application amount of the reactive liquid, and the information is stored in the form of a table in the storage unit 28. A table shown in FIG. 8 specifies the correspondence between the type of printing medium and the reactive liquid amount. In this embodiment, an application amount is set for each printing medium in advance, by assuming that the application amount is 100% when the reactive liquid is discharged to all pixels of 1,200 dpi. In S3, an application amount corresponding to the type of printing medium acquired in S2 is set.

In S4 of FIG. 6, a color conversion process for converting image data having a value (RGB value) indicated by an RGB signal into multilevel data corresponding to each ink to be used in printing is performed. This color conversion process generates multilevel data represented by 8-bit (256-value) information determining the grayscale of each ink in a pixel group including a plurality of pixels. This color conversion process uses a lookup table (LUT) defining the correspondence between the RGB value before the conversion, a value (CMYK value) indicated by a CMYK signal corresponding to each color of the color inks after the conversion, and a value (RCT value) indicated by a signal of the reactive liquid. In this embodiment, the color conversion process is executed by using different LUTs in accordance with the printing condition set in S3. The LUT will be described later.

After that, in S5, a quantization process of quantizing the multilevel data obtained in S4 is performed. This quantization process generates quantized data represented by 1-bit (binary) information determining discharge or non-discharge of each ink and the reactive liquid with respect to each pixel. Note that a method such as dither processing or an error diffusion process can be applied as a method of this quantization.

Then, in S6, a distribution process of distributing the quantized data of each ink and the reactive liquid to a plurality of scans of the printhead 9 in the multipass printing control described earlier is performed. This distribution process generates printing data represented by 1-bit (binary) information determining discharge or non-discharge of each ink and the reactive liquid with respect to each pixel in each of the plurality of scans for a unit region on the printing medium P. After that, the printing operation is started.

Note that the form in which the processing unit 27 of the printing apparatus 1 executes all the processes in S1 to S6 has been explained, but these processes can also be performed by another form. For example, a form in which the host apparatus 100 executes all the processes in S1 to S6 is also possible. Another example is a form in which the host apparatus 100 executes S1 to the color conversion process (S4), and the printing apparatus 1 executes the processes from the quantization process (S5).

FIGS. 9A and 9B are views showing examples of the LUT to be used in the color conversion process in S4. FIG. 9A shows a part of the LUT to be used for a printing medium having a relatively high absorbency, for example, plain paper. FIG. 9B shows a part of the LUT to be used for a printing medium having a low absorbency, for example, a PP film. Note that for the sake of simplicity, FIGS. 9A and 9B each illustrate an LUT in pure black portion RGB (0, 0, 0), in pure white portion RGB (255, 255, 255), and in only a part of a yellow line expressing a color by only yellow ink.

As shown in FIG. 9A, in the LUT for the printing medium having a relatively high absorbency, the RCT value is 0 regardless of the RGB values. Accordingly, multilevel data is generated so as not to discharge the reactive liquid regardless of the RGB values.

On the other hand, in the LUT for the printing medium having a relatively low absorbency as shown in FIG. 9B, the RCT value is set except for the pure white portion. In this embodiment, the output value is 255 when the application amount is 100%, and values linear to % of the application amount are set. That is, the application amount (%) of the reactive liquid is acquired from the table (FIG. 8) of the application amount of the reactive liquid in accordance with the type of printing medium acquired in S3, and the color conversion process is performed by setting the output value of the reactive liquid based on the acquired application amount. FIG. 9B shows an example in which a value: 102 (255×40%) equivalent to an application amount of 40% of the reactive liquid is set.

<Adjustment of Application Amount>

The adjustment of the reactive liquid application amount corresponding to the type of printing medium will be explained. As shown in FIG. 8, printing medium information is preregistered in the printing apparatus 1, and the amounts of the reactive liquid to be used for various kinds of printing media are stored in the storage unit 28. However, the user wants to use a new type of printing medium in some cases. Also, the user sometimes wants to update the application amount of the reactive liquid even for the registered printing medium. In this embodiment, an application amount test operation can optimize the application amount of the reactive liquid in accordance with the type of printing medium.

Figure 10A:
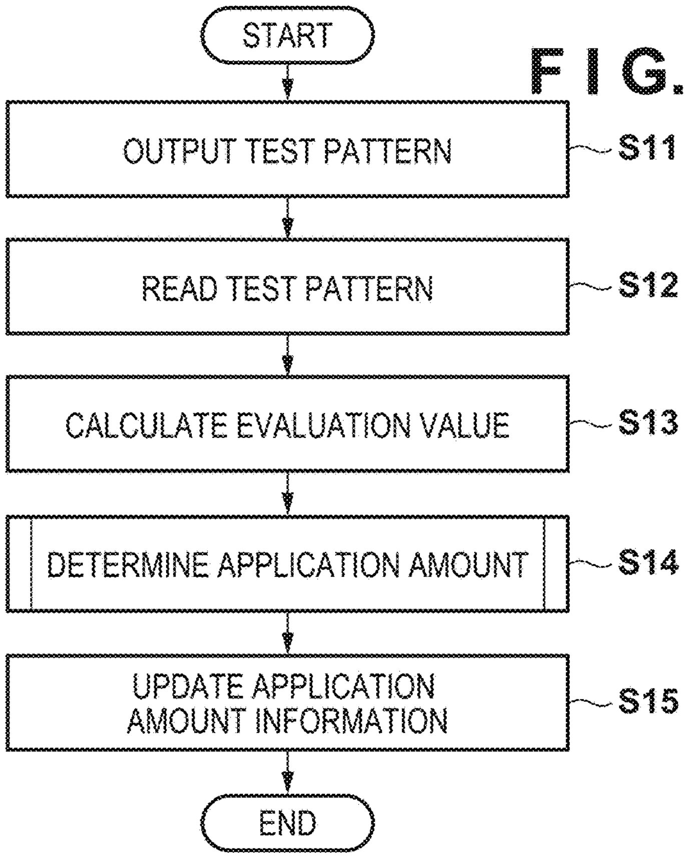
FIGS. 10A and 10B are flowcharts showing processing examples of the processing unit.
Figure 10B:
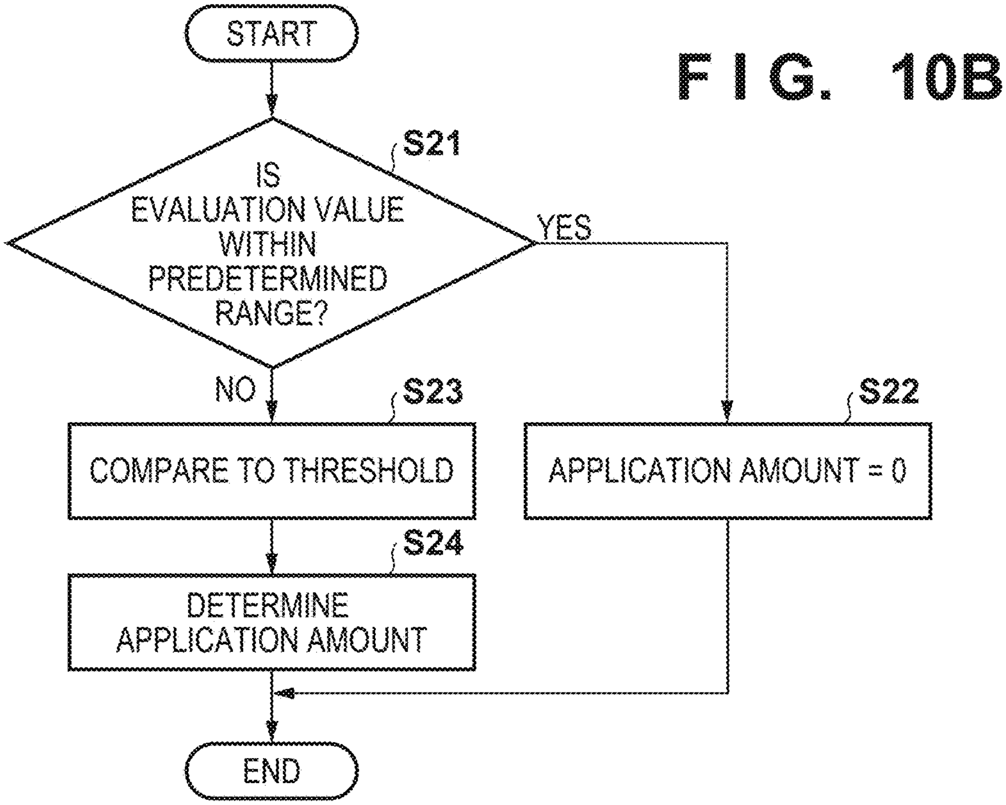

FIGS. 10A and 10B are flowcharts showing processing examples to be executed by the processing unit 27, particularly, flowcharts of processing examples related to the test operation for determining the application amount of the reactive liquid. The processing is executed by an instruction input by the user from the host apparatus 100 or from an operation panel (not shown) of the printing apparatus 1. The processing can also be executed when the specification of a printing medium for which the application amount of the reactive liquid is not registered is selected.

Figure 11:
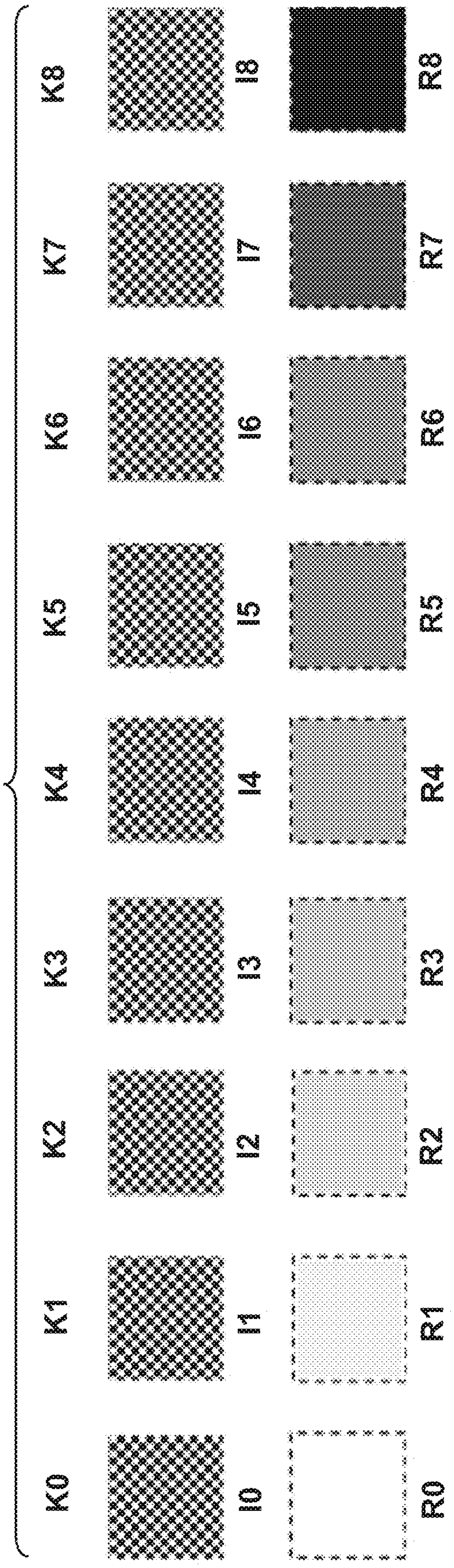
FIG. 11 is a view showing a configuration example of test patterns.
Figure 12A:
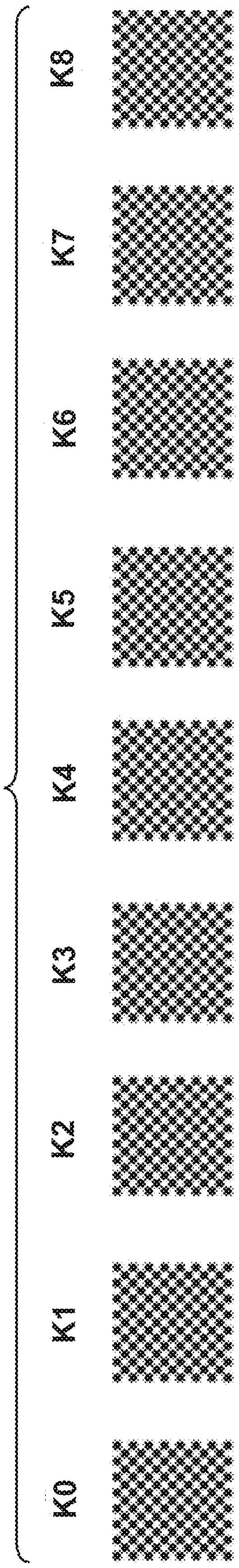
FIGS. 12A and 12B are views showing formation examples of test patterns.
Figure 12B:
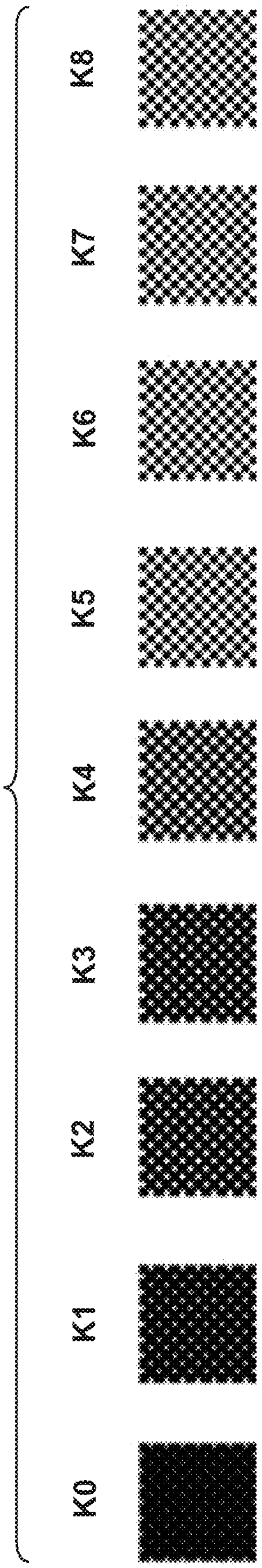

In S11 of FIG. 10A, a test pattern output process is executed. In this step, test patterns are formed on the printing medium P as a target for which the application amount of the reactive liquid is determined. As the test patterns, the printhead 9 forms a plurality of ink images having different application amounts of the reactive liquid. FIG. 11 shows a configuration example of the test patterns. FIGS. 12A and 12B show test pattern formation examples.

As shown in FIG. 11, ink images K0 to K8 are formed as the test patterns by discharging color ink patterns I0 to I8 on patterns R0 to R8 of the reactive liquid discharged on the printing medium P. In this embodiment, the color ink patterns I0 to I8 have the same form, and are particularly lattice-like patterns. In this embodiment, the patterns I0 to I8 are printed by using black ink. The outer shape (contour) of the patterns I0 to I8 is a square, and they are formed in a line as they are spaced apart from each other. This makes it possible to specify the difference between adjacent ink images, and the degree of a change in series of ink images. In this embodiment, the patterns I0 to I8 are spaced apart from each other. However, they need not be spaced apart from each other as long as the position of each pattern can be specified.

The patterns R0 to R8 of the reactive liquid have the same outer shape (contour) and the same area as those of the color ink patterns I0 to I8. The patterns R0 to R8 and the corresponding patterns I0 to I8 are printed as they are overlapped in the same positions on the printing medium P.

The patterns R0 to R8 of the reactive liquid have different application amounts of the reactive liquid, but each pattern is uniform, and the application amount increases from the pattern R0 to the pattern R8. Although the reactive liquid is transparent, FIG. 11 expresses whether the application amount is large or small by the gray level for the purpose of facilitating visual recognition of the application amount.

In this embodiment, the application amount is 100% when one dot of the reactive liquid is placed in all of the 1,200-dpi pixels. The pattern R0 is a pattern where the application amount is 0%, that is, where no reactive liquid is applied. The pattern R1 has an application amount of 10%, and the application amount increases by a predetermined unit (in this embodiment, 10%) from the pattern R2 to the pattern R8. Accordingly, the pattern R8 has an application amount of 80%. Since the difference between the application amounts of the reactive liquid applied to adjacent ink images is 10%, that is, constant, it is possible to easily understand a change in degree of bleeding of the ink images K0 to K8.

FIG. 12A shows test patterns formed on the printing medium P having a sufficient absorbency, and FIG. 12B shows test patterns formed on the printing medium P having a low absorbency. Since the color ink patterns I0 to I8 are the same, ink images having the same form are formed as the ink images K0 to K8, but the degrees of bleeding are different in some cases. In the example shown in FIG. 12A, all of the nine ink images K0 to K8 have little bleeding, so the differences in outer appearance between the ink images K0 to K8 are small. On the other hand, in the nine ink images K0 to K8 of the example shown in FIG. 12B, the color ink patterns bleed differently in accordance with the application amount of the reactive liquid. Bleeding of the color ink pattern is large in the ink image K0 to which no reactive liquid is applied, and little in the ink image K8 in which the application amount of the reactive liquid is large. By specifying an ink image having little bleeding, the application amount of the reactive liquid in this ink image can be determined as an application amount suitable for the printing medium.

As an evaluation index of bleeding of an ink image, the brightness of the ink image is used in this embodiment. In an ink image having a large bleed, the color ink bleeds from the lattice pattern, so the brightness decreases. As the application amount of the reactive liquid increases, the brightness of the ink image gradually increases. When the bleed reduces, the change in brightness is small even when the application amount increases.

Figure 13A:
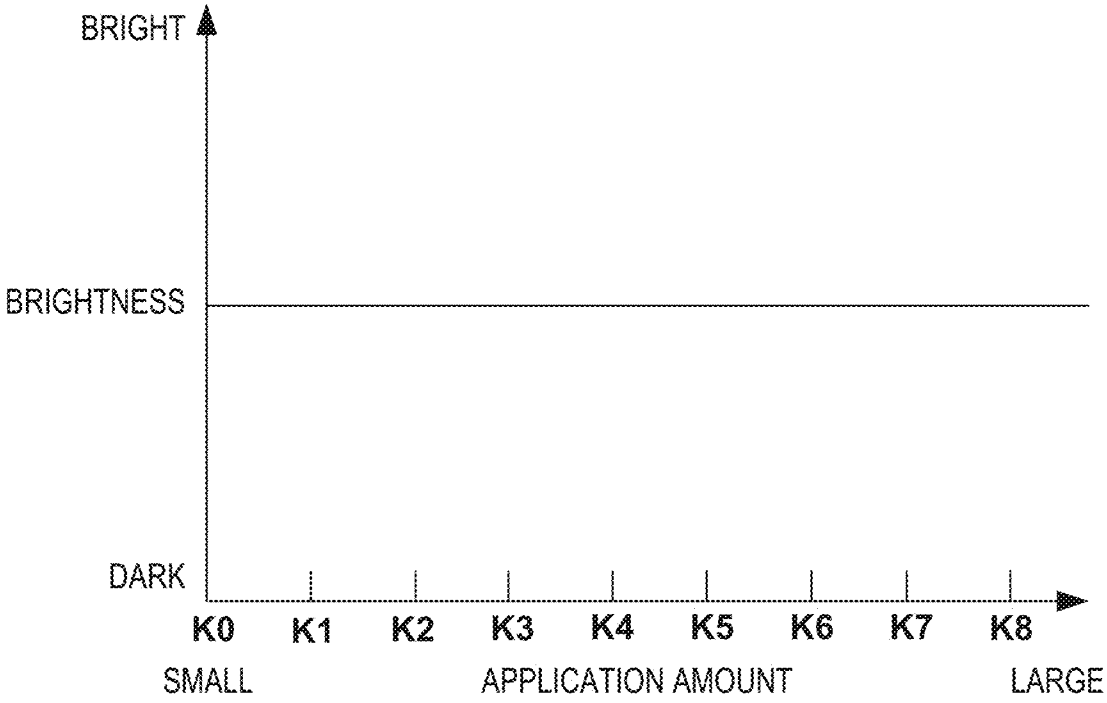
FIGS. 13A and 13B are views showing examples of the relationship between the brightness of an ink image and the application amount of a reactive liquid.
Figure 13B:
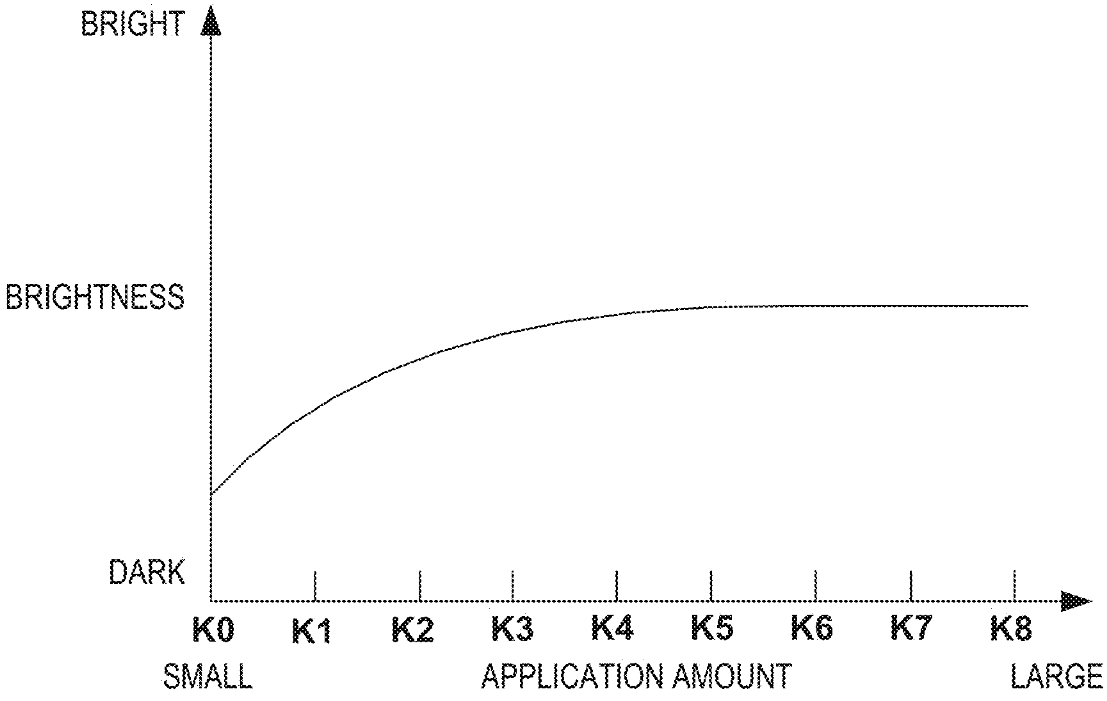

FIGS. 13A and 13B are views showing examples of the relationship between the brightness of an ink image and the application amount of the reactive liquid. FIG. 13A is an example when test patterns are formed on a printing medium having a sufficient absorbency as shown in FIG. 12A. The brightness is practically constant in the ink images K0 to K8. FIG. 13B is an example in which test patterns are formed on a printing medium having a low absorbency as shown in FIG. 12B. The brightness gradually increases as the application amount of the reactive liquid increases. The brightness largely changes from the ink image K0 to the ink image K5, and is practically constant in the ink images K6 to K8. As described above, on a printing medium having a low absorbency, the brightness gradually increases as the application amount of the reactive liquid increases. However, when the reactive liquid application amount sufficient to suppress bleeding is exceeded, the brightness becomes almost constant after that.

As described above, a reactive liquid application amount suitable for a printing medium can be determined from the brightness of an ink image. In this embodiment, the application amount of the reactive liquid is determined by reading the brightness of the ink images K0 to K8 by the read sensor 3.

Referring to FIG. 10A again, in S12, the test patterns formed in S11 are read by the read sensor 3, and the read values of the ink images K0 to K8 are obtained from the read sensor 3. In S13, an evaluation value of the degree of bleeding of each ink image is calculated. In this embodiment, the evaluation value is the brightness of each of the ink images K0 to K8. As the brightness, it is possible to directly use the read values of the ink images K0 to K8 obtained in S12 by the read sensor 3. In this embodiment, however, the moving average of the read values is used. The use of the moving average makes it possible to more accurately specify the tendency of the degree of bleeding of the ink image with respect to an increase in application amount of the reactive liquid. FIGS. 14A and 14B show examples of the evaluation values of the ink images K0 to K8.

In these examples shown in FIGS. 14A and 14B, the moving average of three brightness values (read values) before and after the ink images K0 to K8 is calculated and used as the evaluation value (brightness) of each ink image. For example, the evaluation value of the ink image K1 is the average value of the brightness values (read values) of the ink images K0 to K2. Therefore, the ink images K0 and K8 have no evaluation values. The larger the evaluation value, the higher the brightness. FIG. 14A shows an example of a printing medium having a sufficient absorbency, and FIG. 14B shows an example of a printing medium having a low absorbency. The variation amount of the evaluation values is small in the example shown in FIG. 14A, and large in the example shown in FIG. 14B.

In S14 of FIG. 10A, the application amount of the reactive liquid is determined from the evaluation values calculated in S13. FIG. 10B is a flowchart of S14. In S21, whether the range of a change in evaluation values of the ink images falls within a predetermined range is determined. The predetermined range can be determined based on whether the degrees of bleeding of the ink images can be evaluated as practically equal. In this embodiment, the predetermined range is 1.5. In the example shown in FIG. 14A, the evaluation values have a maximum value of 55.0 and a minimum value of 54.8, so the range of the moving averages is 0.2, that is, smaller than 1.5 as the predetermined range. In the example shown in FIG. 14B, the evaluation values have a maximum value of 54.9 and a minimum value of 40.4, so the range of the moving averages is 14.5, that is, larger than 1.5 as the predetermined range.

If the range of a change in evaluation values of the ink images falls within the predetermined range in S21 of FIG. 10B, the process advances to S22; if not, the process advances to S23. The process advances to S22 in the example shown in FIG. 14A, and advances to S23 in the example shown in FIG. 14B.

In S22, it is determined that the application amount of the reactive liquid is 0. That is, the printing medium P as a target of the determination of the reactive liquid application amount causes little bleeding even when no reactive liquid is applied, so the reactive liquid is not applied.

In S23, the evaluation value of each ink image is compared with a threshold. In S24, the application amount of the reactive liquid is determined based on the comparison result in S23. In this step, the application amount of the reactive liquid applied to an ink image having an evaluation value having a predetermined magnitude relationship with the threshold is specified. The threshold is determined based on whether the evaluation value (brightness) has reached an equilibrium state, and can be derived from the evaluation value calculated in S13. In this embodiment, the threshold is derived by threshold=maximum value−(maximum value−minimum value)×5%. In the example shown in FIG. 14B, threshold=54.9−(54.9−40.4)×5%≈54.

Then, a minimum application amount of the application amounts of the reactive liquid applied to ink images having evaluation values exceeding threshold: 54, of the evaluation values of the ink images K1 to K7, is determined as the application amount of the reactive liquid with respect to the printing medium P as a target. In the example shown in FIG. 14B, ink images having evaluation values exceeding threshold: 54 are the ink images K4 to K7, and the application amount (R4): 40% of the reactive liquid applied to the ink image K4 is determined as the application amount of the reactive liquid with respect to the printing medium P as a target.

Referring back to FIG. 10A, in S15, the application amount information (FIG. 8) is updated by the application amount as the determination result in S14. When the printing medium P as a target is an unregistered printing medium, a new printing medium type is set, and the application amount in S14 is set in association with the new type. When the printing medium P as a target is a registered printing medium, the application amount associated with this printing medium type is updated by the application amount in S14. The process is thus complete.

As described above, this embodiment can provide a technique that determines a reactive liquid application amount corresponding to the type of printing medium. An optimum application amount of the reactive liquid can be determined by using test patterns. Printing can be performed by optimizing the application amount of the reactive liquid, even when different brands of the same type of printing media have absorbency differences, or even when using unregistered types of printing media.

Note that this embodiment has been explained by taking an example in which nine ink images different in application amount of the reactive liquid are formed. However, when at least two ink images different in reactive liquid amount are formed, an optimum application amount of the reactive liquid can be determined based on the type of printing medium from the results of reading the ink images. In this case, the ink images preferably include at least an ink image in which the application amount of the reactive liquid is 0. In this embodiment, the application amount is determined based on the range of a change in evaluation values of ink images, that is, based on whether the variation amount falls within a predetermined range. However, the application amount can also be determined from the difference between evaluation values or the radio of the evaluation values. In this embodiment, the application amount of the reactive liquid is not determined from the absolute value of an evaluation value of each ink image, but determined based on the correlation between evaluation values of a plurality of ink images.

Second Embodiment

Figure 15:
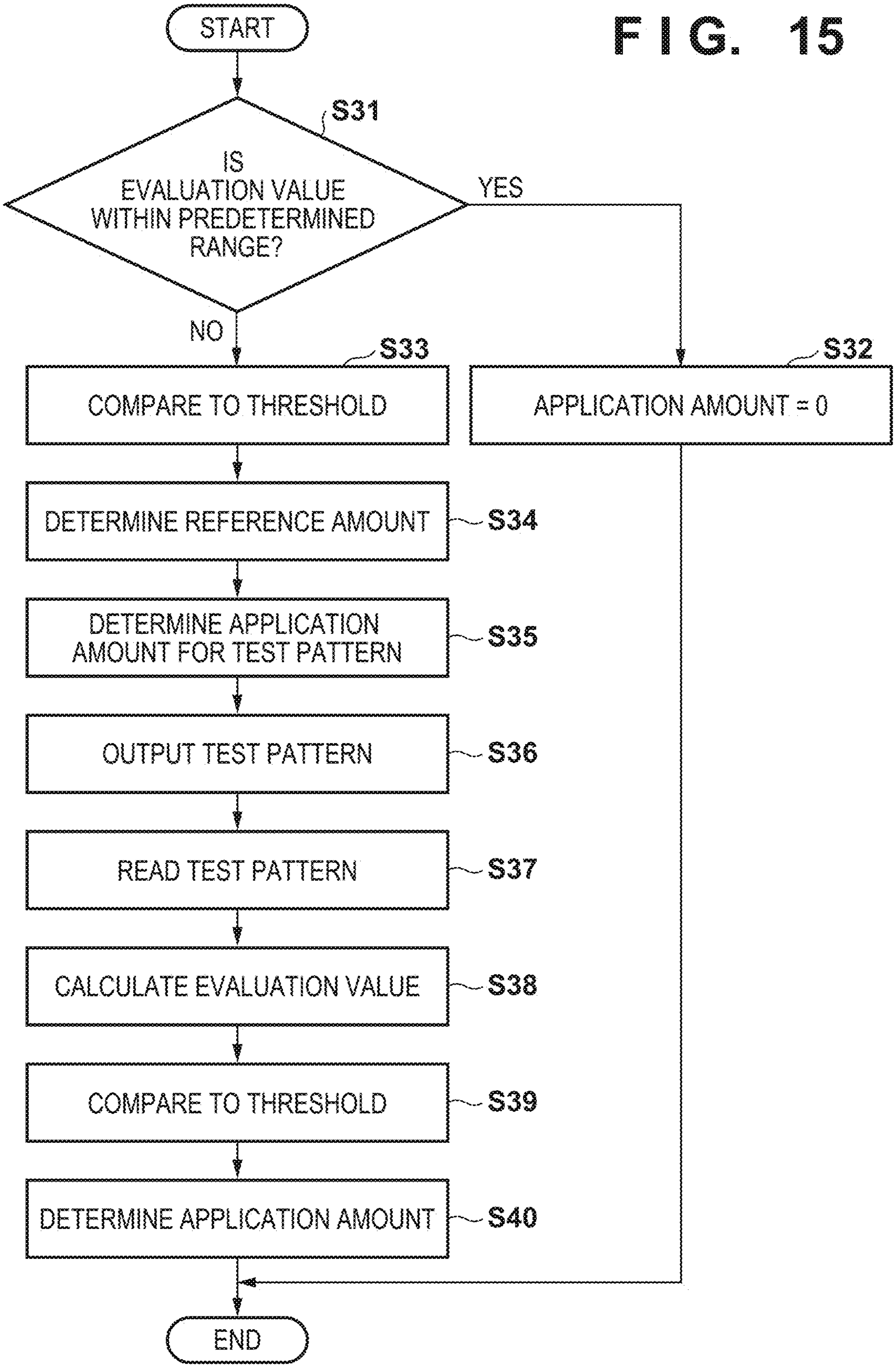
FIG. 15 is a flowchart showing a processing example of the processing unit.

When determining an application amount of a reactive liquid, the application amount can be determined more finely by printing and reading test patterns in multiple stages. In this embodiment, the basic flow is the same as the process shown in FIG. 10A of the first embodiment except the contents of processing in S14. FIG. 15 shows a processing example replacing FIG. 10B, and is a flowchart showing a processing example in S14 of FIG. 10A.

In S31, the same processing as in S21 of FIG. 10B is performed. That is, based on the read results of test patterns (primary test patterns) shown in FIG. 11, whether the range of a change in evaluation values of ink images falls within a predetermined range is determined. If the range of the change in evaluation values of the ink images falls within the predetermined range, the process advances to S32; if not, the process advances to S33. In S32, it is determined that the application amount of the reactive liquid is 0. That is, a printing medium P as a target of the determination of the reactive liquid application amount causes little bleeding even when no reactive liquid is applied, so the reactive liquid is not applied.

In S33, the evaluation value of each ink image is compared with a threshold. This is the same processing as in S23 of FIG. 10B. In S34, a reference amount of the application amount of the reactive liquid is determined based on the comparison result in S33, in order to print next test patterns (secondary test patterns). In this step, the application amount of the reactive liquid applied to an ink image having an evaluation value having a predetermined magnitude relationship with the threshold is specified. As in the first embodiment, the threshold is derived by threshold=maximum value−(maximum value−minimum value)×5% by using the evaluation value. In the example shown in FIG. 14B, threshold=54 as described in the first embodiment.

Then, a minimum application amount of the application amounts of the reactive liquid applied to ink images having evaluation values exceeding threshold: 54, of the evaluation values of ink images K1 to K7, is determined as the reference value. In the example shown in FIG. 14B, ink images having evaluation values exceeding threshold: 54 are the ink images K4 to K7, and the application amount (R4): 40% of the reactive liquid applied to the ink image K4 is determined as the reference amount.

Figure 16:
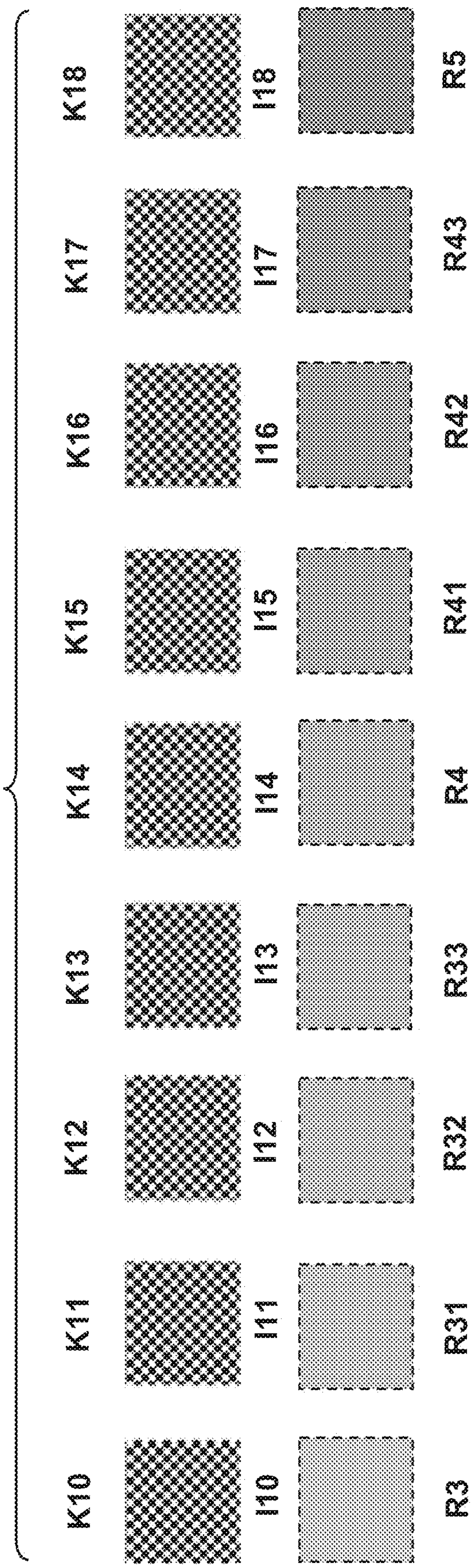
FIG. 16 is a view showing a configuration example of secondary test patterns.

In S35, application amounts of the reactive liquid in the secondary test patterns are determined by regarding that an optimum application amount exists before or after the reference amount determined in S34. FIG. 16 shows a configuration example of the secondary test patterns. The configuration of the secondary test patterns of this embodiment is the same as that of the primary test patterns shown in FIG. 11. That is, ink images K10 to K18 as the secondary test patterns are formed by discharging color ink patterns I10 to I18 on patterns R3 to R5 of the reactive liquid discharged on the printing medium P. The color ink patterns I10 to I18 are the same as the patterns I0 to I8 shown in FIG. 11.

Application amounts of the patterns of the reactive liquid are set around the reference amount determined in S34. In the example shown in FIG. 14B, the application amount of the pattern R4 of the primary test patterns is the reference amount as described above. Accordingly, it is regarded that an optimum application amount exists between the patterns R3 to R5 of the primary test patterns. In the configuration example of the secondary test patterns shown in FIG. 16, therefore, it is determined that the reactive liquid application amount corresponding to the ink image K14 for which the reactive liquid application amount is an intermediate amount is the same (40%) as the pattern R4, the reactive liquid application amount corresponding to the ink image K10 for which the reactive liquid application amount is a minimum amount is the same (30%) as the pattern R3, and the reactive liquid application amount corresponding to the ink image K18 for which the reactive liquid application amount is a maximum amount is the same (50%) as the pattern R5.

Figure 17A:
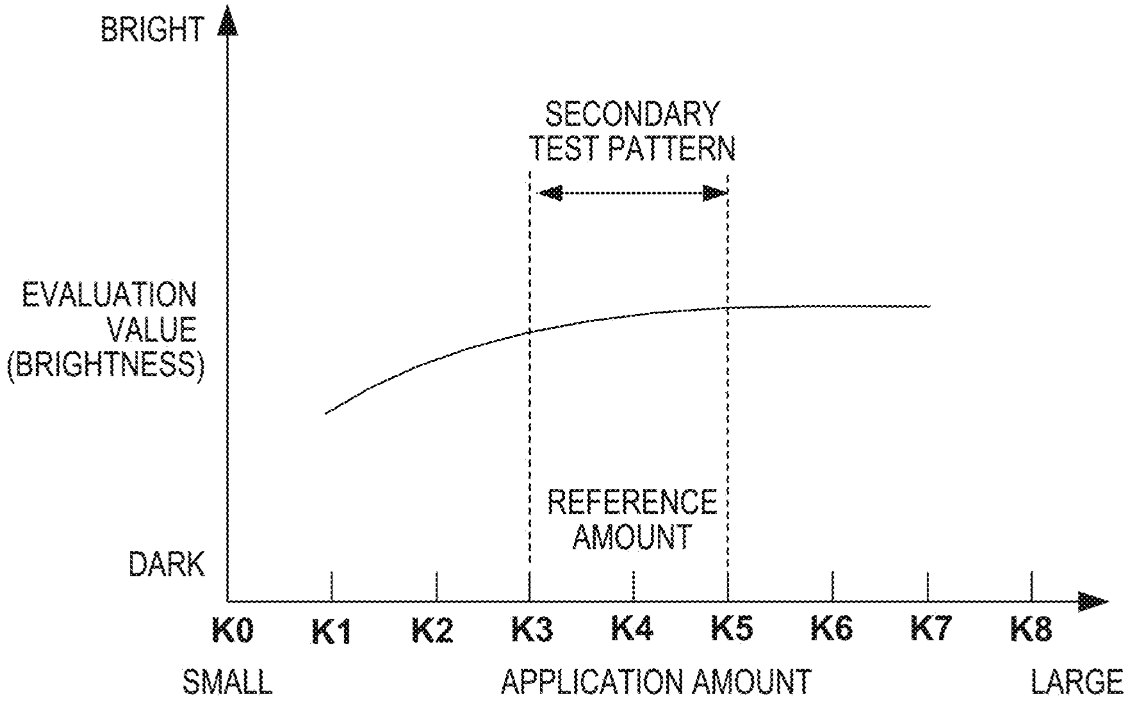
FIG. 17A is a view showing the range of the application amount of a reactive liquid of secondary test patterns with respect to primary test patterns.

FIG. 17A shows the range of the reactive liquid application amounts of the secondary test patterns with respect to the primary test patterns. The difference between the minimum value and the maximum value of the reactive liquid application amounts in the secondary test patterns is smaller than the difference between the minimum value and the maximum value of the reactive liquid application amounts in the primary test patterns, but the numbers of the ink images are the same. Accordingly, the application amount can be determined more finely.

The reactive liquid application amounts (patterns R31 to R33 and R41 to R43) corresponding to the ink images K11 to K13 and K15 to K17 are set such that the application amount evenly increases. That is, the application amounts of the patterns R31 to R33 and R41 to R43 are set at 32.5%, 35%, 37.5%, 42.5%, 45%, and 47.5%. Like FIG. 11, FIG. 16 expresses whether the application amount of the reactive liquid is large or small by the gray level for the purpose of facilitating visual recognition of the application amount.

Figure 18A:
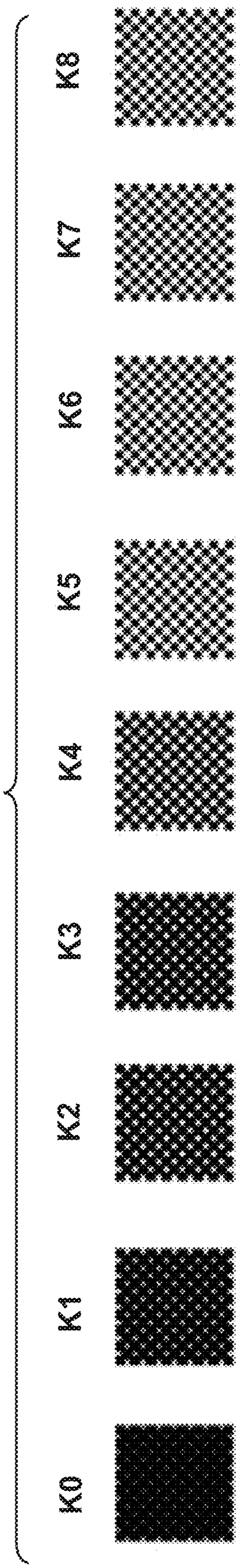
FIG. 18A is a view showing a formation example of the primary test patterns.
Figure 18B:
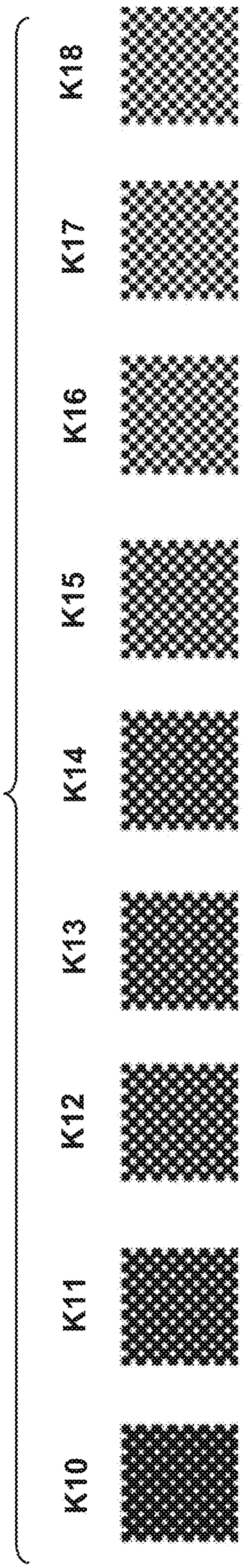
FIG. 18B is a view showing a formation example of the secondary test patterns.

Referring to FIG. 15 again, in S36, a secondary test pattern output process is executed based on each application amount of the reactive liquid determined in S35. FIG. 18A shows primary test patterns formed on a low-absorbency printing medium (the same as FIG. 12B), and FIG. 18B shows secondary test patterns formed on the same low-absorbency printing medium. A change in brightness of the ink images of the secondary test patterns is smaller than that of the primary test patterns.

Figure 17B:
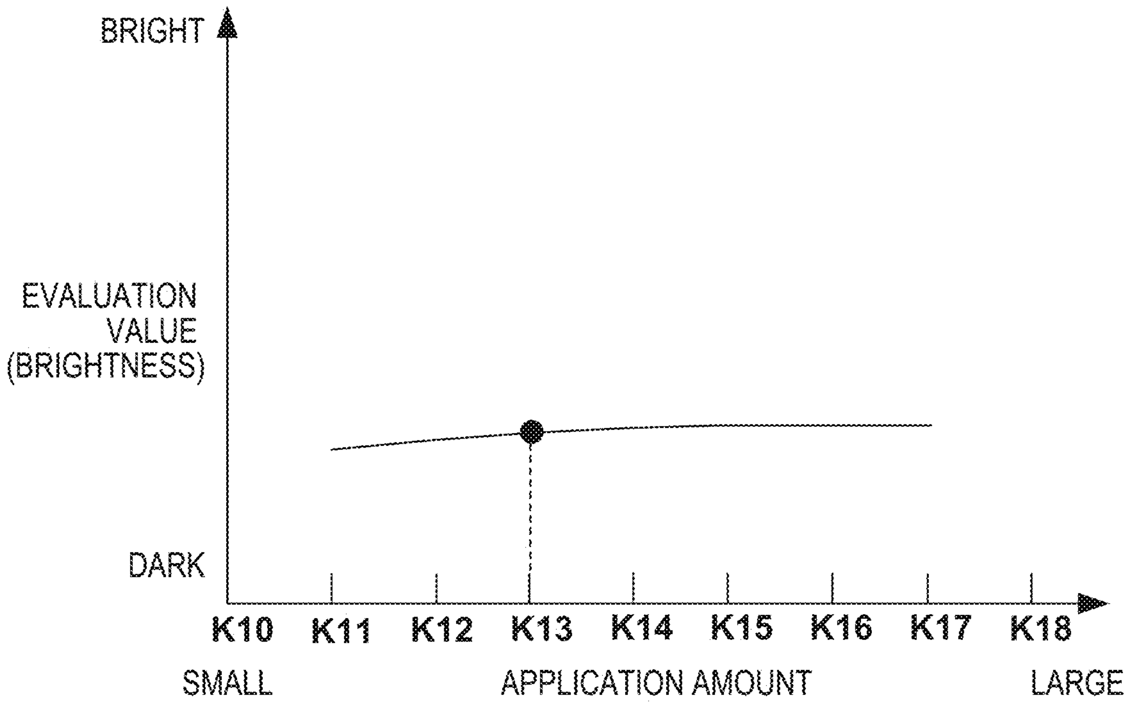
FIG. 17B is a view showing an example of the relationship between the brightness of an ink image and the application amount of a reactive liquid in the secondary test patterns.

In S37, the test patterns formed in S36 are read by a read sensor 3, thereby obtaining the read values of the ink images K10 to K18 by the read sensor 3. In S38, evaluation values of the degrees of bleeding of the ink images K10 to K18 are calculated. The method of calculating the evaluation values is the same as that for the evaluation values of the primary test patterns, and evaluation values are calculated for the ink images K11 to K17. FIG. 17B shows the relationship between the evaluation values of the ink images K11 to K17 and the application amounts of the reactive liquid. A change in evaluation value with respect to a change in application amount of the reactive liquid is smaller than that of the relationship shown in FIG. 17A.

In S39, the evaluation value of each ink image of the secondary test patterns is compared with a threshold. In S40, the application amount of the reactive liquid is determined based on the comparison results in S39. In this step, an application amount of the reactive liquid applied to an ink image having an evaluation value having a predetermined magnitude relationship with the threshold is specified. The threshold is the same as that used in S33.

Then, a minimum application amount of the application amounts of the reactive liquid applied to ink images having evaluation values exceeding the threshold, of the evaluation values of the ink images K11 to K17, is determined as the application amount of the reactive liquid with respect to the printing medium P as a target. FIG. 17B shows a case in which the evaluation value of the ink image K13 exceeds the threshold, and the corresponding application amount of the reactive liquid is minimum. This process is completed as described above. In this embodiment, a reactive liquid application amount suitable for a printing medium can be determined more finely than that in the first embodiment.

Other Embodiments

The printhead 9 can be a thermal-jet printhead using heater elements as ink and reactive liquid discharge elements, and can also be a piezoelectric head using piezoelectric elements as those discharge elements.

The color ink patterns in the test patterns are not limited to lattice-like patterns. The color ink patterns can be various patterns such as stripe patterns including both regions covered with and not covered with color ink.

The read value of the test pattern is not limited to the brightness, and can also be another index such as the reflection density on which the influence of ink bleed is reflected.

The number of ink images in the test patterns is not limited to 9 as in the above embodiments. It is also possible to appropriately select the application amount in the patterns of the reactive liquid. For example, the reactive liquid patterns can be configured by a pattern in which the application amount is 0% and a plurality of patterns in which the application amount exceeds 0%.

Also, the explanation has been made by assuming that the value used to determine whether the evaluation value of each ink image falls within the predetermined range is 1.5, but this value is not limited to 1.5. The threshold (S23, S33, and S39) is also not limited to 54. The threshold can be derived from the calculated evaluation values as in the abovementioned embodiments, and can also be a predetermined value. However, the threshold is preferably a value that makes it possible to determine that the evaluation value has reached an equilibrium state.

Furthermore, an example in which the application amount of the reactive liquid is set to the same amount regardless of the RGB values in portions other than a pure white portion has been explained. However, the application amount can also be changed in accordance with the RGB values.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-141647, filed Aug. 31, 2021, which is hereby incorporated by reference herein in its entirety.

What is claimed is:

1. A printing apparatus comprising:

a printing unit configured to apply ink containing a coloring material, and a reactive liquid that reacts with the ink, to a printing medium;

a reading unit configured to read an ink image on the printing medium;

a printing control unit configured to cause the printing unit to print a plurality of ink images different in application amount of the reactive liquid on the printing medium; and a determination unit configured to determine an application amount of the reactive liquid in printing using a predetermined type of printing medium, based on a ratio of a plurality of reading results obtained by the reading unit by reading the plurality of ink images printed on the predetermined type of printing medium.

2. The apparatus according to claim 1, wherein the ratio is a ratio of evaluation values respectively corresponding to the plurality of reading results.

3. The apparatus according to claim 1, wherein the plurality of ink images include not less than three ink images, and an application amount of the reactive liquid to be applied to each ink image is increased by a predetermined unit.

4. The apparatus according to claim 3, wherein the reading result of a predetermined ink image of the plurality of ink images is an average value of reading results obtained by the reading unit by reading an ink image group including the predetermined ink image and ink images before and after the predetermined ink image and having close application amounts of the reactive liquid.

5. The apparatus according to claim 1, wherein the determination unit determines, based on the ratio, that the application amount of the reactive liquid in printing using the predetermined type of printing medium is 0.

6. The apparatus according to claim 1, further comprising a storage unit configured to store information indicating the correlation between the type of printing medium and the application amount of the reactive liquid, wherein the information is updated by a determination result of the determination unit.

7. The apparatus according to claim 1, wherein the plurality of ink images include an ink image in which the application amount of the reactive liquid is 0.

8. The apparatus according to claim 1, wherein the plurality of ink images are formed in a line in a predetermined direction such that the plurality of ink images are spaced apart from each other.

9. The apparatus according to claim 8, wherein application amounts of the reactive liquid to be applied to two adjacent ink images of the plurality of ink images have a constant difference.

10. The apparatus according to claim 1, wherein the printing control unit causes the printing unit to form a plurality of first ink images having different application amounts of the reactive liquid on the predetermined type of printing medium, and causes the printing unit to form a plurality of second ink images having different application amounts of the reactive liquid, the application amounts of the reactive liquid being adjusted based on reading results of the plurality of first ink images obtained by the reading unit, and the determination unit determines the application amount of the reactive liquid in printing using the predetermined type of printing medium, based on a ratio of reading results of the plurality of second ink images obtained by the reading unit.

11. The apparatus according to claim 10, wherein a difference between a maximum value and a minimum value of application amounts of the reactive liquid to be applied to the plurality of second ink images is smaller than a difference between a maximum value and a minimum value of application amounts of the reactive liquid to be applied to the plurality of first ink images.

12. The apparatus according to claim 1, wherein the printing control unit controls application of the ink by the printing unit such that ink images having the same form are formed as the plurality of ink images.

13. The apparatus according to claim 1, wherein the printing control unit controls application of the ink by the printing unit such that lattice-like ink images are formed as the plurality of ink images.

14. The apparatus according to claim 1, wherein the reactive liquid is a liquid that promotes thickening or gelation of the ink.

15. The apparatus according to claim 1, wherein the reactive liquid is a liquid that suppresses bleeding of the ink on the printing medium.

16. The apparatus according to claim 1, wherein the reading unit reads brightness of an ink image.

17. A control method of a printing apparatus which includes a printing unit configured to apply ink containing a coloring material, and a reactive liquid that reacts with the ink, to a printing medium; and a reading unit configured to read an ink image on the printing medium, the method comprising:

causing the printing unit to print a plurality of ink images different in application amount of the reactive liquid on the printing medium; and determining an application amount of the reactive liquid in printing using a predetermined type of printing medium, based on a ratio of a plurality of reading results obtained by the reading unit by reading the plurality of ink images printed on the predetermined type of printing medium.

18. A non-transitory computer-readable storage medium storing a program that causes a computer for controlling a printing apparatus which includes a printing unit configured to apply ink containing a coloring material, and a reactive liquid that reacts with the ink, to a printing medium, and a reading unit configured to read an ink image on the printing medium, to function as:

a printing control unit configured to cause the printing unit to print a plurality of ink images different in application amount of the reactive liquid on the printing medium; and a determination unit configured to determine an application amount of the reactive liquid in printing using a predetermined type of printing medium, based on a ratio of a plurality of reading results obtained by the reading unit by reading the plurality of ink images printed on the predetermined type of printing medium.

* * * * *